(12) United States Patent
Kissell

(10) Patent No.: US 7,159,620 B2
(45) Date of Patent: Jan. 9, 2007

(54) PIPE BLANKET TO FIT A VARIETY OF PIPE DIAMETERS

(75) Inventor: Ronald E. Kissell, Shelbyville, IN (US)

(73) Assignee: Knauf Insulation GmbH, Shelbyville, IN (US)

( * ) Notice: Subject to any disclaimer, the term of this patent is extended or adjusted under 35 U.S.C. 154(b) by 344 days.

(21) Appl. No.: 10/654,773

(22) Filed: Sep. 4, 2003

(65) Prior Publication Data
US 2004/0079431 A1   Apr. 29, 2004

Related U.S. Application Data

(60) Provisional application No. 60/407,991, filed on Sep. 4, 2002.

(51) Int. Cl.
F16L 9/14 (2006.01)
(52) U.S. Cl. .................. 138/149; 138/169; 138/170
(58) Field of Classification Search .............. 138/170, 138/169, 149
See application file for complete search history.

(56) References Cited

U.S. PATENT DOCUMENTS

| | | | |
|---|---|---|---|
| 2,160,009 A | | 5/1939 | Walker |
| 3,679,533 A | | 7/1972 | Fukuda et al. |
| 4,009,735 A | | 3/1977 | Pinsky |
| 4,157,410 A | * | 6/1979 | McClintock ............... 428/40.6 |
| 4,243,453 A | * | 1/1981 | McClintock ................. 156/152 |
| 4,413,656 A | * | 11/1983 | Pithouse ..................... 138/110 |

FOREIGN PATENT DOCUMENTS

| | | |
|---|---|---|
| CH | 410 560 A | 3/1966 |
| DE | 105154 | 12/1898 |
| DE | 11 81 511 B | 11/1964 |

(Continued)

OTHER PUBLICATIONS

Johns Manville sales brochure for Micro-Flex Large Diameter Pipe and Tank Wrap; 2 pages, © 2003.

(Continued)

Primary Examiner—James Hook
(74) Attorney, Agent, or Firm—Barnes & Thornburg LLP

(57) ABSTRACT

A pipe blanket is provided for wrapping around and insulating a pipe. The pipe blanket comprises an insulation mat having an outer surface and an inner surface adapted to lie adjacent the pipe when the pipe blanket is wrapped around the pipe. An outer cover of the pipe blanket is coupled to the outer surface of the insulation mat. The insulation mat is configured to enclose a variety of pipes having different sized diameters. The pipe blanket further includes a closure means configured for securing the insulation mat and outer cover about the pipe. The insulation mat further includes a plurality of pleats.

5 Claims, 18 Drawing Sheets

U.S. PATENT DOCUMENTS

| | | | |
|---|---|---|---|
| 4,442,585 A | | 4/1984 | McGehee, Sr. et al. |
| 4,584,217 A | * | 4/1986 | McClintock ............... 428/41.8 |
| 4,606,957 A | * | 8/1986 | Cohen ...................... 428/40.9 |
| 4,777,086 A | | 10/1988 | Madden et al. |
| 4,810,677 A | | 3/1989 | Heinze et al. |
| 5,069,969 A | * | 12/1991 | McClintock et al. ....... 428/36.5 |
| 5,123,453 A | * | 6/1992 | Robbins ..................... 138/149 |
| 5,141,793 A | * | 8/1992 | Fontanilla .................. 428/40.4 |
| 5,690,147 A | * | 11/1997 | Cridland et al. ............ 138/149 |
| 5,733,624 A | | 3/1998 | Syme et al. |
| 5,964,252 A | * | 10/1999 | Simmons et al. .......... 138/149 |
| 6,016,846 A | | 1/2000 | Knittel et al. |
| 6,382,260 B1 | | 5/2002 | Sproule, III |
| 6,403,180 B1 | | 6/2002 | Barrall |
| 6,783,830 B1 | * | 8/2004 | Cohen et al. .............. 428/40.1 |

FOREIGN PATENT DOCUMENTS

| | | |
|---|---|---|
| DE | 8702741 | 4/1987 |
| DE | 3932291 A1 | 4/1991 |
| DE | 199 06 734 C1 | 7/2000 |
| DE | 100 09 302 A | 9/2001 |
| EP | 0 217 396 A2 | 4/1987 |
| FR | 1 256 923 | 2/1961 |
| GB | 541 951 A | 12/1941 |

OTHER PUBLICATIONS

APi Distribution sales brochure for CertainTeed Crimp Wrap Tank Insulation; 1 page printed from website www.apidistribution.com; Dec. 4, 2003.

CertainTeed Fiber Glass Insulation sales brochure for insulation products; 2 pages printed from website www.certainteed.com; Dec. 4, 2003.

Owens Corning sales brochure for Flex Wrap Pipe Insulation; 1 page printed from website www.owenscorning.com; Dec. 4, 2003.

* cited by examiner

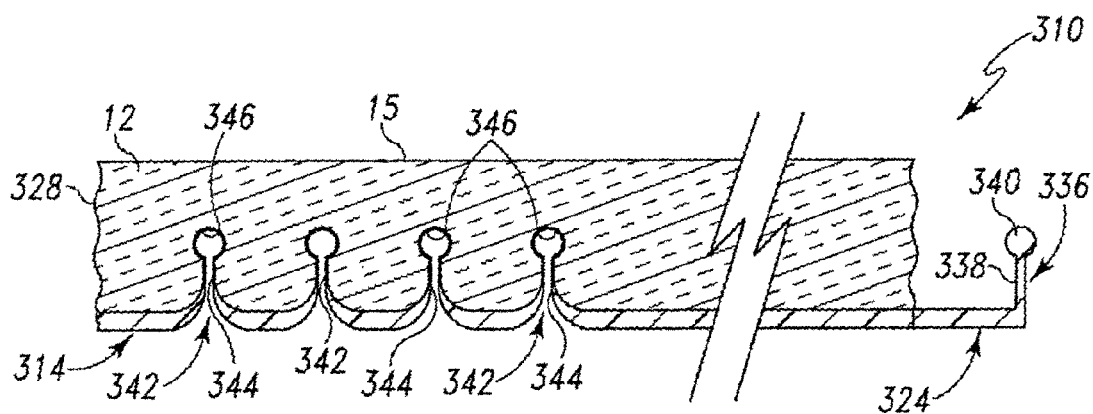
Fig. 6
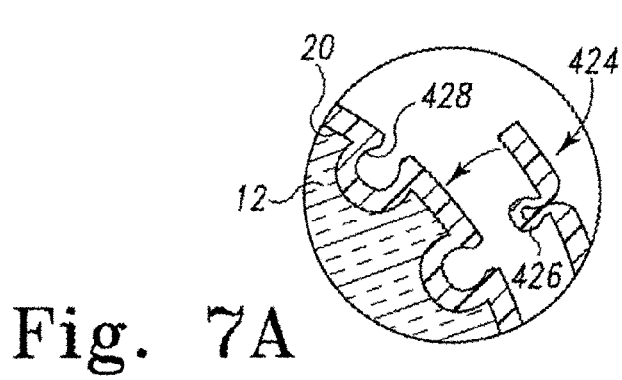
Fig. 7A
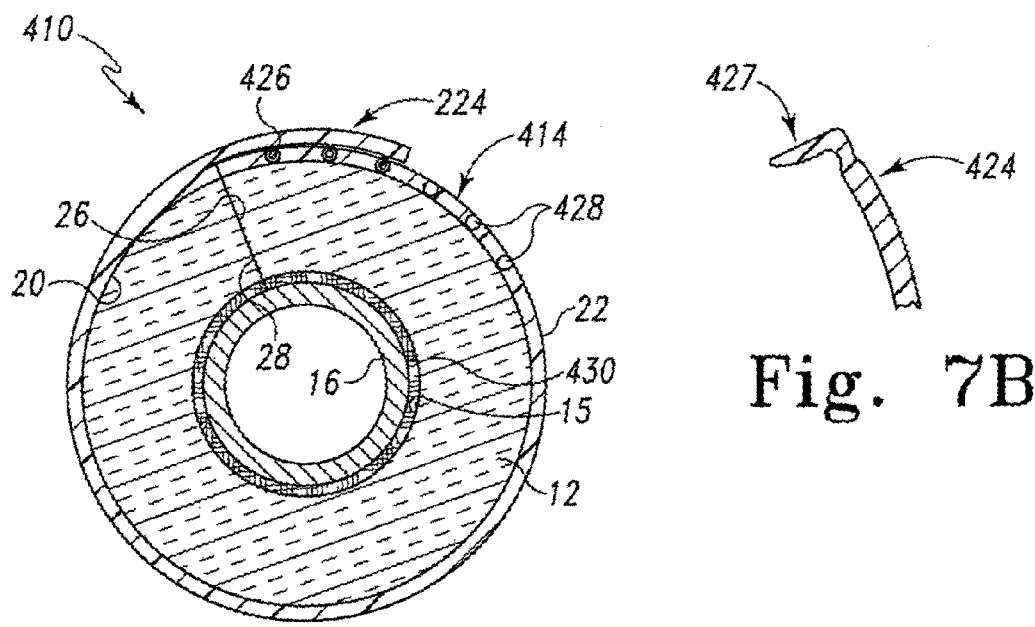
Fig. 7B
Fig. 7

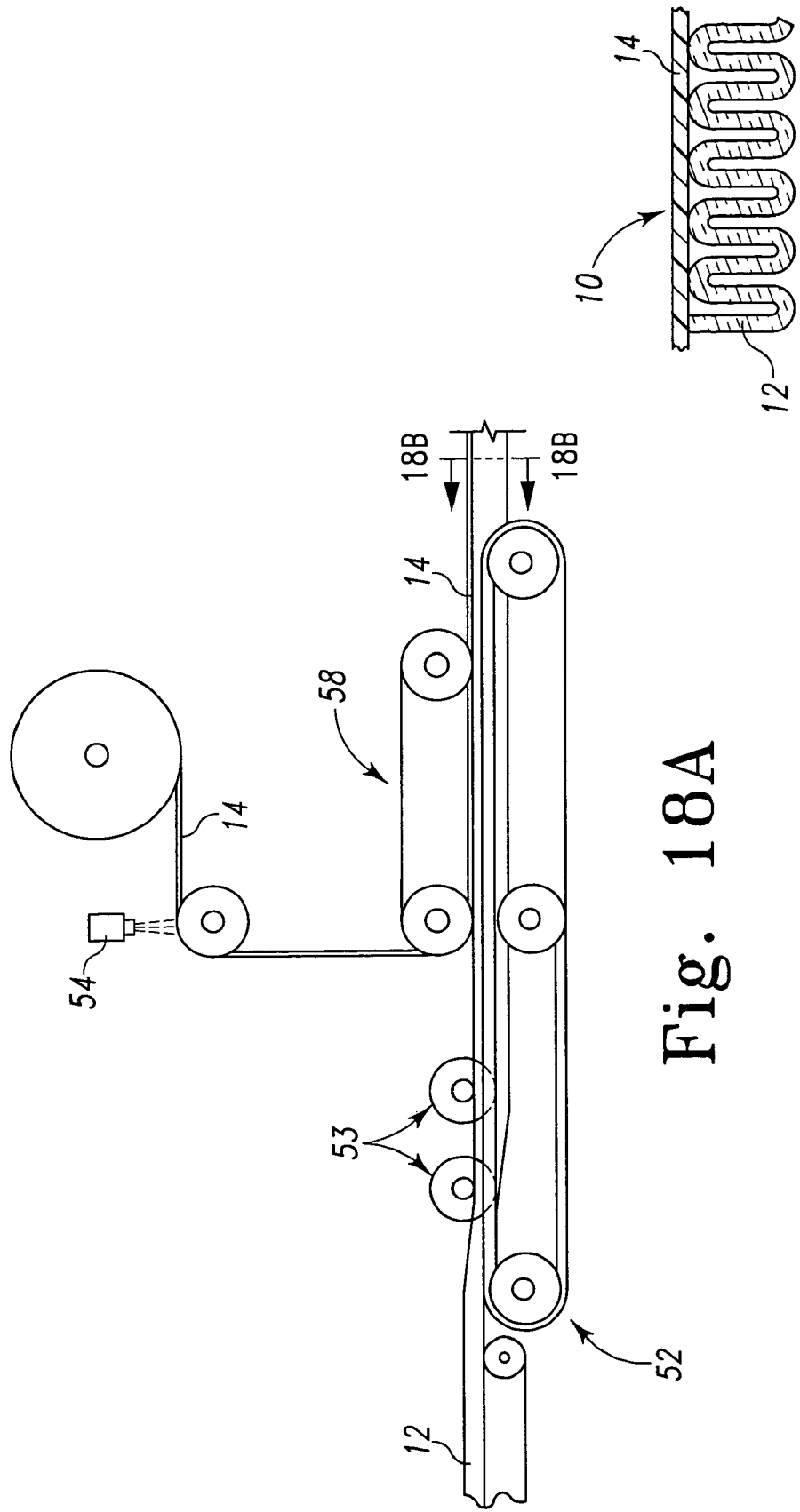

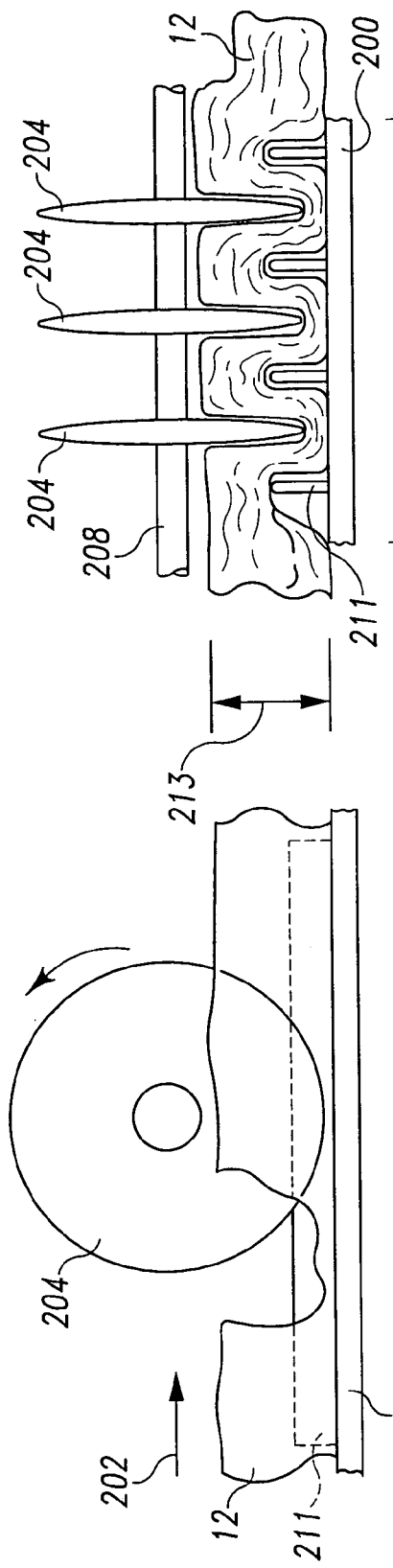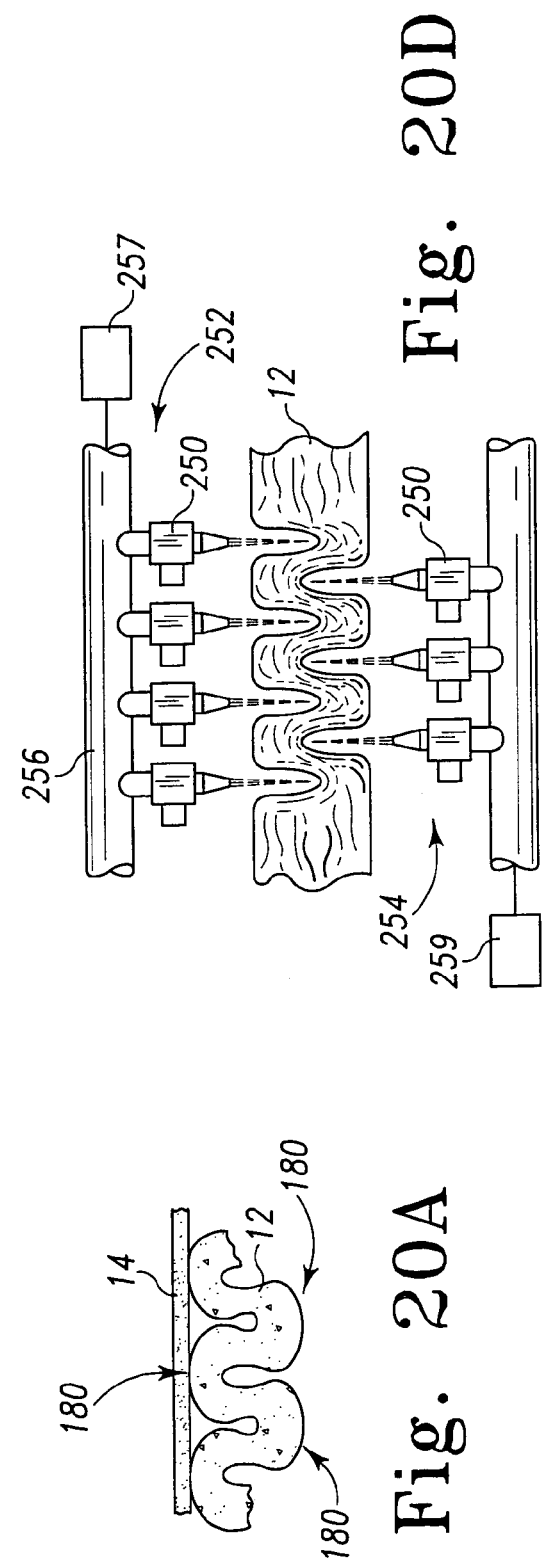

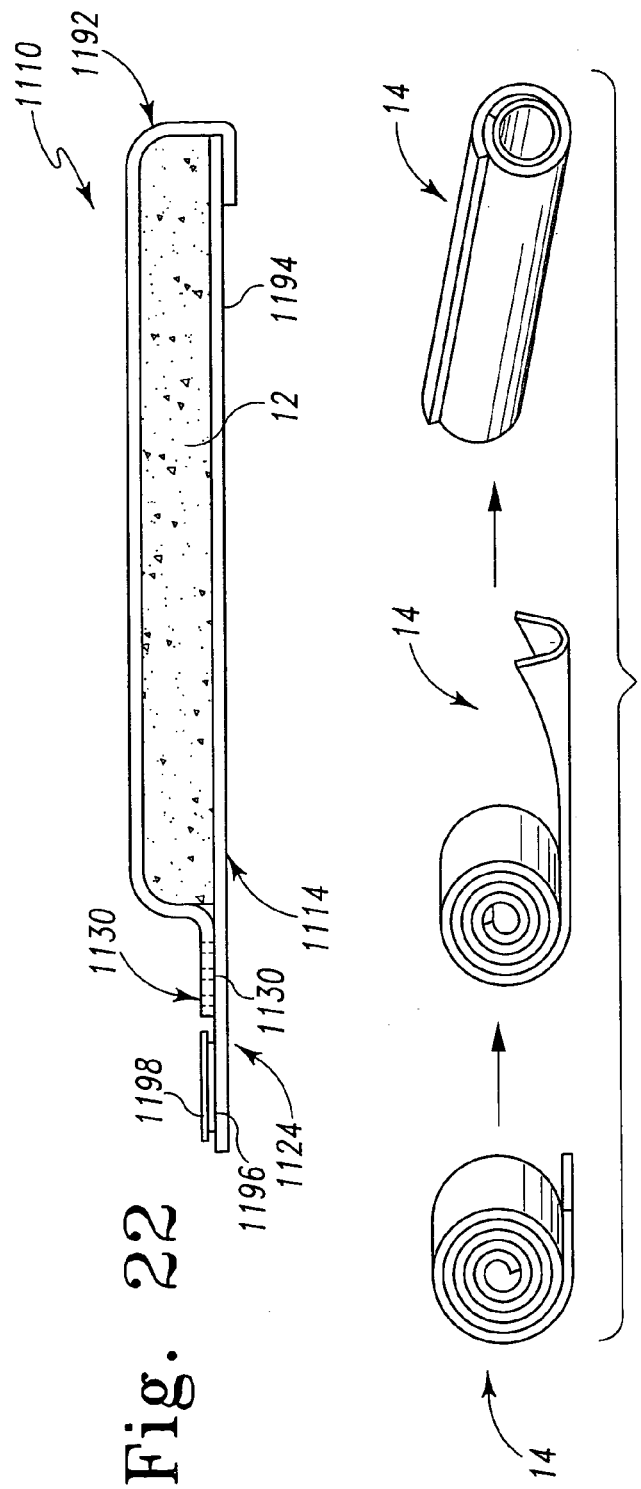
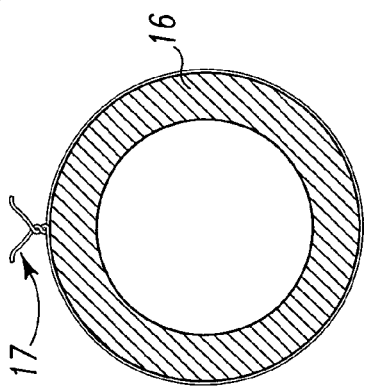
Fig. 22  Fig. 23  Fig. 24

PIPE BLANKET TO FIT A VARIETY OF PIPE DIAMETERS

CROSS-REFERENCE TO RELATED APPLICATION

This application claims priority under 35 U.S.C. 119(e) to U.S. Provisional Application Ser. No. 60/407,991, filed Sep. 4, 2002, which is expressly incorporated by reference herein.

FIELD OF THE INVENTION

The present invention relates to insulation for enclosing equipment or other structures, and particularly to insulation for enclosing pipes.

BACKGROUND

Flexible insulation blankets are used to insulate pipes and other structures such as cooling tanks, water pressure tanks, etc. Flexible insulation blankets generally include some type of insulation to be wrapped about the pipe and may also include an outer cover or jacket wrapped about the insulation. Many types of insulation are pre-molded to fit a certain sized pipe. This rigid material is molded to fit only one size of pipe and cannot usually be used for pipes of other sizes.

Some types of duct wrap insulation, on the other hand, include an outer covering or facing and may be flexible for wrapping about different sized round or rectangular shapes. One type of flexible insulation is commonly referred to as crimped fiber. Crimped fiber insulation undergoes a process which causes a more random orientation of the fibers within the insulation. An example of crimpled fiber insulation mats include Micro-Flex™ made by Johns Manville (Denver, Colo.), Crimp Wrap Tank Insulation made by Certainteed Fiber Glass Insulation (Valley Forge, Pa.), and Fiberglas® Flex Wrap made by Owens Corning (Toledo, Ohio).

Another form of flexible fibrous pipe insulation is a fabricated item that is cut from discrete segments of insulation. These segments are cut to the desired dimensions and glued to a facing or outer cover. Examples of such commercially available products include Micro-Flex™ CTS by Johns Manville (Denver, Colo.), Fiberglas Pipe and Tank Insulation from Owens Corning (Toledo, Ohio), and Pipe and Tank Insulation from Knauf Insulation GmbH (Shelbyville, Ind.).

SUMMARY

According to the present disclosure, a pipe blanket is provided for insulating pipes and other structures such as cooling tanks or water pressure tanks, for example. The pipe blanket of the present disclosure is pre-cut to a certain width and is provided to fit a variety different pipe diameters. The pipe blanket includes an insulation mat, a cover coupled to the insulation mat, and a closure means configured for securing the insulation mat and outer cover about the pipe. The insulation mat of the pipe blanket is configured to fit a variety of pipe sizes or diameters by being able to stretch and compress to fit each pipe. The closure means secures the insulation mat and cover about the pipe. The insulation mat may also be trimmed to be sized for a variety of pipe diameters without affecting the function of the closure means. The pipe blanket may also be wrapped about a pipe of a particular size multiple times without effecting the function of the closure means. Various closure means of the present disclosure include, but are not limited to a hook-and-loop closure, an adhesive flap or joint cover, a detent and notch or snap-fit closure, an adjustable strap, etc.

Further according to the present disclosure, a pipe blanket is provided which is formed to be conformable about a pipe. The pipe blanket includes an insulation mat and an outer cover coupled to the insulation mat. The insulation mat includes an outer surface and an inner surface adapted to lie adjacent the pipe when the pipe blanket is wrapped around the pipe. The insulation mat further includes an inner region having a first density and an outer region having a second density less than the first density. The first, lower density of the inner region provides an inner region which is more able to be compressed and thus wrapped by a user about a pipe to conform to the pipe. The second, higher density of the outer region provides an strengthened, reinforced, and sturdy outer region. It is within the disclosure to include two or more regions having different densities throughout the thickness of the insulation mat.

In one embodiment of the disclosure, the inner region is pleated to form pleats within the inner region. It is also within the scope of this disclosure to pleat the entire thickness, or both the inner and outer regions, of the insulation mat. In another embodiment, fibers of the inner region have a smaller diameter than the fibers of the outer region. A lesser amount of binder may also be used on the inner region than on the outer region to provide a softer, more compliant and/or resilient inner region. In yet another embodiment, fibers of the inner region may include fibers oriented to lie in a less laminar or more random orientation having a greater percentage of substantially vertically oriented fibers than the fibers of the outer region which may be oriented to lie substantially in a horizontal plane. The fibers of the inner, less laminar region are thus able to compress toward each other about a pipe to provide a more compliant inner region.

According to still another embodiment of the present disclosure, a method for forming a textured fibrous insulation mat includes preparing the insulation mat by coating glass fibers of the insulation mat with a resin binder. A fibrous insulation mat may include an insulation mat made of fiber glass ceramic, and/or polymer fibers, for example. The method further includes providing heat to a portion of a surface of the insulation mat to partially cure the resin binder in a predetermined pattern and finally, curing the insulation mat. The heat may be provided by hot air jets, heated rotating disks, and/or heated profiles which indent the insulation mat as a conveyor belt moves the insulation mat thereby. The heat may further be provided linearly across the insulation mat to provide pleats within the insulation mat.

Features of the present disclosure will become apparent to those skilled in the art upon consideration of the following detailed description of preferred embodiments exemplifying the best mode of carrying out the disclosure as presently perceived.

BRIEF DESCRIPTION OF THE DRAWINGS

The detailed description particularly refers to the accompanying figures in which:

FIG. 6 is a sectional view of another pipe blanket prior to being wrapped about a pipe showing grooves formed in the cover and through the insulation mat for receiving a flange at an opposite end of the cover to secure the pipe blanket about a pipe;

FIG. 7 is a sectional view of another pipe blanket wrapped about a pipe showing another closure device of the pipe blanket including notches formed in a portion of the cover and detents for coupling or snapping into the notches to secure the pipe blanket about the pipe;

FIG. 7A is a sectional view showing a portion of the closure device of FIG. 7;

FIG. 7B is a sectional view of a portion of yet another closure device showing an alternative detent or hook formed to be received within a corresponding notch or grove (not shown) of the cover;

FIG. 18A is a schematic view similar to FIG. 18 showing a pleating process of a pipe blanket to create folds or pleats within the insulation mat;

FIG. 18B is a sectional view taken along line 18A—18A schematically showing the pleated insulation mat;

FIG. 20A is a sectional view showing a pleated insulation having continuous, un-cut folds or pleats which are coupled to an outer cover;

FIG. 20B is a schematic side view of another pleating system for forming pleats in an insulation mat of a pipe blanket showing the insulation mat passing through a rotating disk and a rib member provided along a conveyor belt;

FIG. 20C is a schematic end view of the pleating system shown in FIG. 20B showing three disks, four rib members, and a pleated insulation portion of a pipe blanket formed therebetween;

FIG. 20D is a schematic end view of yet another pleating system for forming pleats in an insulation portion of a pipe blanket showing multiple air jet valves of the system which emit jets of air onto the insulation mat as the insulation mat passes thereby;

FIG. 22 is a sectional view of an illustrative pipe blanket having a wicking cloth coupled to an inner surface of the insulation mat and showing the wicking cloth wrapped around and coupled to a portion of the cover as well;

FIG. 23 is a part diagrammatic, part perspective view of a cover for a pipe blanket which has been pre-formed such that after being unrolled the cover is urged to take the form of a cylinder, the cylinder being more easily wrappable about a pipe;

FIG. 24 is a sectional view of a pipe and a wire wrapped about the pipe for attaching a pipe blanket thereto during installation of the pipe blanket about the pipe;

DETAILED DESCRIPTION OF THE DRAWINGS

A pipe blanket is provided for covering and insulating various pipes of all different sizes. The pipe blanket is manufactured in such a way that the user is able to cut the pipe blanket to fit pipes of different lengths and/or diameters while still providing a closure device or means of securing the pipe blanket around a specific pipe. The insulation mat of the pipe blanket may also be manufactured in such a way so as to provide a pipe blanket which more easily conforms to and wraps about a pipe or pipes of various sizes. Although the term "pipe" blanket is used, it is within the scope of this disclosure for the pipe blankets disclosed herein to cover other structures such as cooling tanks, water pressure tanks, portable food and beverage containers, valves, fittings, ducts, tubes, supports, other irregular shapes and so forth.

The pipe blankets of the present disclosure illustratively include fiber glass mats. The fiber glass mats illustratively may be made from a standard rotary fiber glass process, or may be made in a wet process, similar to a paper-making process. While reference is made herein to fiber glass mats, the insulation mats of the present disclosure may be made of any suitable material.

Figure 1:
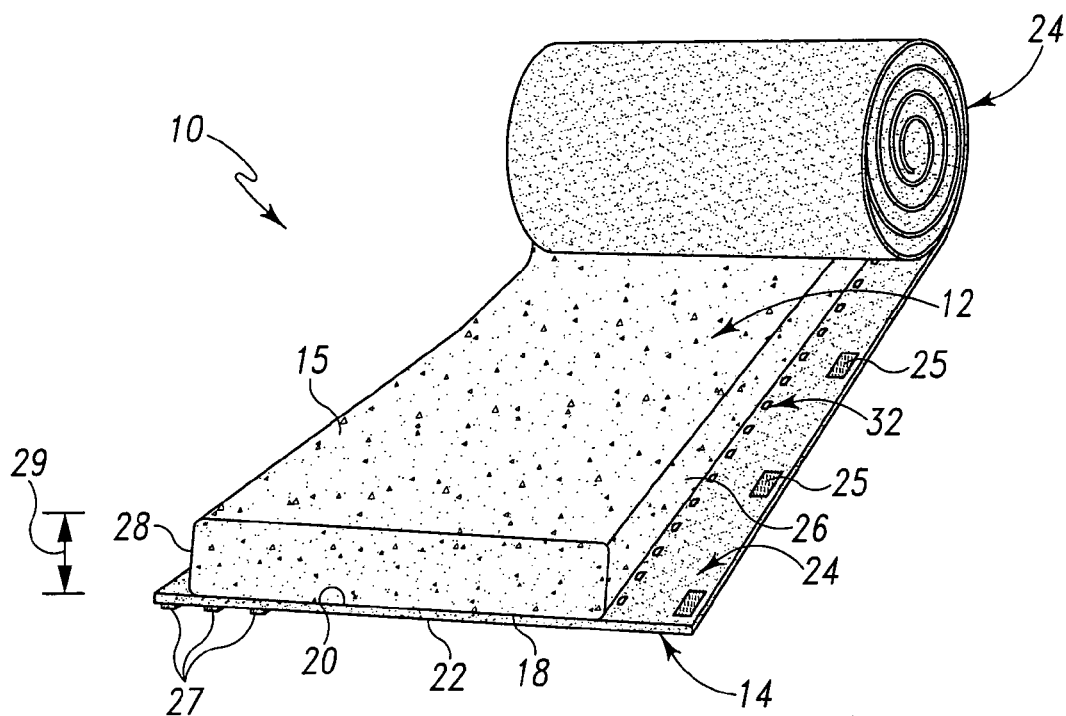
FIG. 1 is a perspective view of a pipe blanket showing the blanket prior to placement around a particular pipe and showing the blanket including an insulation portion or mat and a cover coupled to one side of the insulation mat, and further showing the cover including a closure device, illustratively a flap, extending beyond the insulation.

As shown in FIG. 1, an illustrative pipe blanket 10 includes an insulation mat 12 and an outer covering 14 coupled to insulation mat 12. Insulation mat 12 may be glass fiber, for example, or another suitable and relatively flexible insulative material. Outer cover 14 may be made of various materials including PVC, fabric, thin gauge metals such as steel or aluminum foils, various types of films or sheets such as polyester, acrylic, Tedlar, PTFE, aluminum, elastomers such as rubber, papers containing glass, polymer and organic fibers and/or laminates made with the above materials including woven and/or non-woven reinforcement fibers. Illustrative outer covers 14 may be purchased from Lamtec Corp. (Flanders, N.J.) and/or Compac Corp. (Netcong, N.J.). As is discussed in greater detail below, cover 14, as well as all covers disclosed herein, may be formed to have sufficient stiffness to receive and retain various fasteners therethrough while remaining substantially tear-resistant.

FIG. 1 illustrates how the pipe blanket 10 may appear after being shipped to the customer or user and prior to installation about a particular pipe. Insulation mat 12 includes an inner or facing surface 15 for positioning around a pipe, such as pipe 16, shown in FIG. 2, for example, and an opposite outer surface 18. Covering 14 is coupled to outer surface 18 of insulation mat 12 and similarly includes an inner surface 20 (coupled to outer surface 18 of insulation mat 12) and an opposite outer surface 22. Illustratively, insulation mat 12 has a height or thickness 29 of approximately two to four inches.

Figure 2:
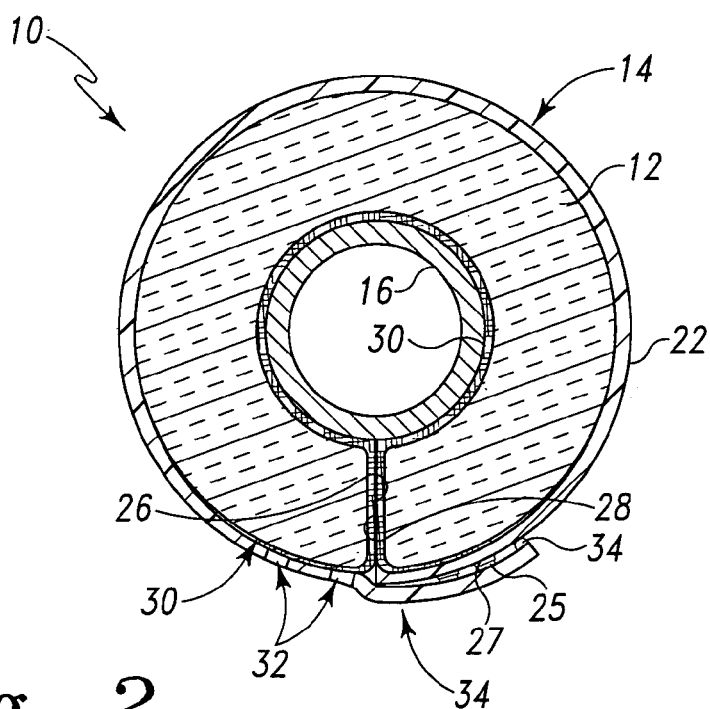
FIG. 2 is a sectional view of the pipe blanket of FIG. 1 positioned around a pipe and showing the flap of the cover closing and securing the pipe blanket about the pipe.

Pipe blanket 10 further includes a hook-and-loop closure device including a flap or extension portion 24 of covering 14 which, as shown in FIG. 1, extends beyond a first end 26 of insulation mat 12. Inner surface 20 of flap 24 includes small hook portions 25 of the closure device while an end portion of outer surface 22 (near a second end 28 of insulation mat 12) includes corresponding loop portions 27 for coupling with hook portions 25 of flap 24, as shown in FIG. 2. Illustrative hook and loop portions 25, 27 are the same as or similar to Velcro™ type closure devices.

Also shown in FIG. 2 is a wicking cloth 30 wrapped about pipe 16 and covering each end 26, 28 of insulation mat 12 for moisture control and/or isolation or containment of insulation mat 12. It is noted that the use of wicking cloth 30 is optional. Pipe blanket 10 is installed around pipe 16 to fully cover and insulate pipe 16. Flap 24 further includes vents 32 near first end 26 of insulation mat. Vents 32 allow moisture collected by wicking cloth 30 to evaporate and aid in drawing moisture away from pipe 16. The illustrative use of vents 32 is also optional. As shown in FIG. 2, hook portions 25 of flap 24 are matingly coupled loop portions 27 of outside surface 22 of covering 14 to secure pipe blanket 10 about pipe 16. Illustratively, a seal bead 34 including a suitable type of permanent or semi-permanent adhesive may also be used to further secure flap 24 to outer surface 22 of covering 14.

Pipe blanket 10 may or may not be pre-made or pre-formed to fit a particular pipe or range of pipe sizes or other structures. Therefore, pipe blanket 10 may be cut to the desired length and may be used to cover a range of various pipe diameters including irregular or non-standard sized pipes. Further, other shapes or structures in addition to pipes may be covered as well. The shipping and handling may also be facilitated due to the ability to compression package the pipe blanket 10 and store pipe blanket 10 in roll form. As mentioned above, and shown in FIG. 2, for example, pipe blanket 10 is compatible with the incorporation of wicking cloth 30 for moisture control. Pipe blanket 10 provides a method of enclosing equipment or structures, such as pipe 16, for example, with insulation which may be adjusted in size at the job site to fit the particular structure or object to be covered. In other words, the illustrative pipe blanket 10 may eliminate the need for customers at a particular job site to order insulation to fit their particular and exact needs. Instead, a bulk amount of pipe blanket 10 can be ordered and easily adjusted in size during installation.

As shown, cover 14 (including the closure system) of pipe blanket 10 is shipped pre-attached to insulation mat 12. Cover 14 protects against abuse and weather so that pipe blanket 10 is an adjustable or cut-to-fit, abuse resistant, water-vapor retardant, and weather resistant insulation system. As mentioned above, pipe blanket 10 may be cut to the needed length and is adjustable to fit a range of circumferences without the need for the installer to cut the width of the pipe blanket at the job site. The pipe blankets of the present disclosure are generally flexible such that a particular pipe blanket, which may be pre-cut to a certain width, is able to fit and wrap around a variety of pipe diameters without cutting or trimming. It is, however, within the scope of this disclosure for a customer to reduce the width of pipe blanket 10 by cutting off or removing a portion of the insulation mat 12 and/or cover 14 along a length of the pipe blanket 10, for example. As is discussed in greater detail below, other pipe blankets disclosed herein may be cut along their length to fit a smaller pipe or alternatively may be wrapped more than one revolution about a smaller pipe to provide additional insulation and/or eliminate the need to cut the pipe blanket on the job site. The closure devices or means described herein, such as flap 24 with hook portions 25 and loop portions 27 shown in FIGS. 1 and 2, for example, allow the pipe blanket to be secured about a pipe of any suitable size.

Figure 2A:
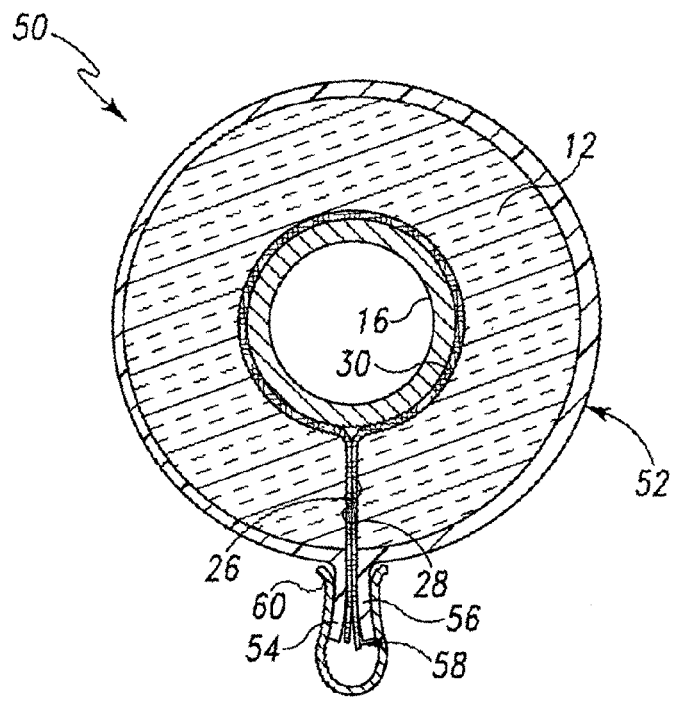
FIG. 2A is a sectional view of another pipe blanket positioned around a pipe showing a wicking cloth of the pipe blanket protruding below a standing seam of the pipe blanket to provide for the discharge of moisture away from the pipe without the need for vent holes such as those shown in FIG. 2, for example.

Another pipe blanket 50 is shown in FIG. 2A. Wicking cloth 30 of pipe blanket 50 is shown to be exposed to the surrounding atmosphere to provide for the discharge of moisture without the need for vent holes, such as vents 32 shown in FIG. 2, for example. However, it is within the scope of this disclosure to provide vent holes as well. A cover 52 of pipe blanket 50 includes two flaps 54, 56 which extend beyond respective ends 26, 28 of the insulation mat 12 coupled to cover 52. Wicking cloth 30 is wrapped around pipe 16 and is formed at a length sufficient to provide elongated tail portions 58 which drape down past ends 26, 28 of insulation mat 12. A fastener such as a staple, rivet, button, clip 60 (shown in FIG. 2A), tie, etc., for example, secures flaps 54, 56 about tail portions 58 of wicking cloth 30 to secure the pipe blanket 50 about pipe 16. The seam or joint formed by pipe blanket 50 is commonly referred to as a standing seam where the two ends 26, 28 of the pipe blanket 50 meet each other and do not generally overlap with one another when the pipe blanket is secured about pipe 16. Illustrative tail portions 58 of wicking cloth 30 are exposed to the surrounding air to provide for the discharge or evaporation of moisture which may collect about pipe 16. As mentioned above, by providing tail portions 58 of wicking cloth 30, which are exposed to air, the need for vent holes, such as vent holes 32 shown in FIG. 2, for example, is reduced or eliminated.

Figure 2B:
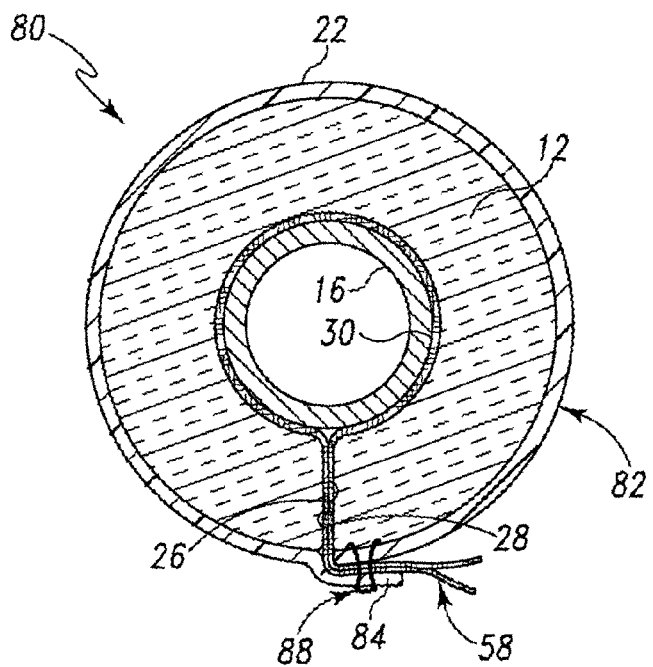
FIG. 2B is a sectional view of yet another pipe blanket wrapped around a pipe showing a lap seam of the pipe blanket formed by a flap or closure of the cover and also showing a wicking cloth of the pipe blanket extending beyond the lap seam to provide for the discharge of moisture.

Yet another pipe blanket 80 is shown in FIG. 2B. Pipe blanket 80, similar to pipe blanket 50, includes wicking cloth 30 which extends through or beyond the lap seam created by wrapping pipe blanket 80 about pipe 16 to expose wicking cloth 30 to the air without the use of vent holes 32 (shown in FIG. 2). A cover 82 of pipe blanket 80 includes a flap 84 which extends beyond end 26 of insulation mat 12 to attach to outer surface 22 of cover 82 near end 28 to create a lap seam. Illustrative wicking cloth 30 shown in FIG. 2B is sufficiently long to provide tail portions 58 of wicking cloth 30 which extend beyond the lap seam created by flap 84 of cover 82. As mentioned above, tail portions 58, which are exposed to air, provide for the discharge of moisture which may form around pipe 16 without the need for vent holes 32. Illustratively, flap 84 of cover 82 is secured to a portion of cover 82 near end 28 of insulation 12 by a fastener 88 such as a staple, rivet, button, clip, tie, etc.

In addition to the closure devices or closure means described above with respect to FIGS. 1–2B for securing a pipe blanket about a pipe, a variety of additional closure means are also available, as illustrated in FIGS. 3–17, for example. Although various closure means are illustrated and described herein, it is within the scope of this disclosure to provide other pipe blankets having other suitable closure means and methods for securing a pipe blanket about a pipe or other structure.

Figure 3:
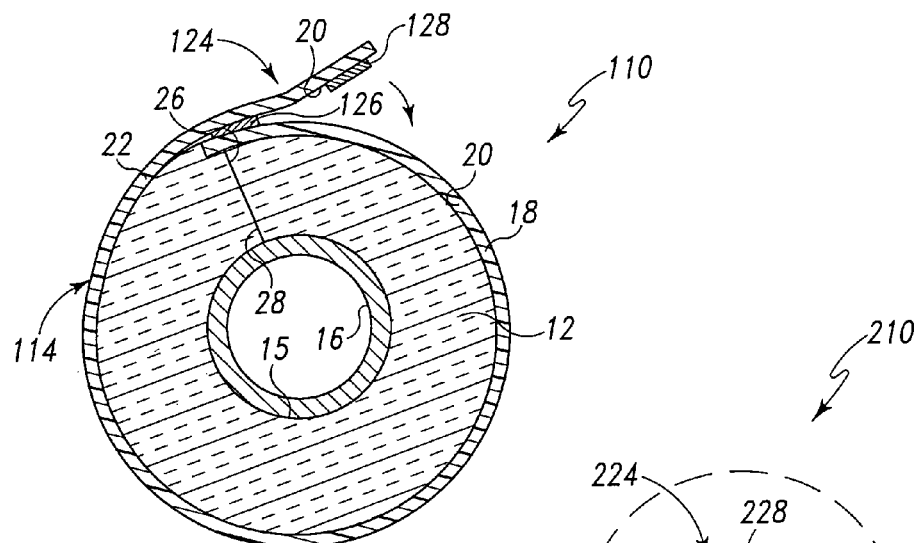
FIG. 3 is a sectional view of another pipe blanket wrapped about a pipe showing an alternative closure device of the pipe blanket having an adhesive closure or coupling means.

Looking now to FIG. 3, a pipe blanket 110 is provided having a flap 124. Pipe blanket 110 is similar to pipe blanket 10; therefore, like references numerals have been used to denote like features. Flap 124 has a first adhesive 126 and a second adhesive 128 attached to surface 20 for bonding with a portion of outer surface 22 of cover 114. Adhesive 126 may be a soft, high traction coating such as a soft polymer or a weak adhesive, for example. It is within the scope of this disclosure for such a soft polymer to be pre-cured. Adhesive 128 is, illustratively, a high strength adhesive, possibly protected prior to use by a release strip (not shown), for example. Upon installation, therefore, the user may couple a first portion of flap 124 including weak or temporary adhesive 126 to outer surface 22 of cover 114 in order to initially align and secure the pipe blanket 110 about the pipe 16. Second adhesive 128 may then be exposed and coupled to outer surface 22 of cover 114 to more securely and/or permanently couple flap 124 to cover 114. Alternatively, it is within the scope of this disclosure for adhesive 128 to be a microencapsulated resin for pressure or heat activation.

Figure 5:
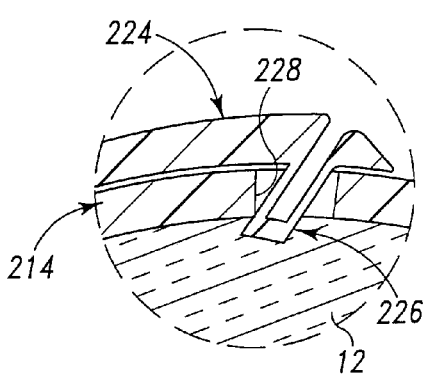
FIG. 5 is an enlarged sectional view of a portion of the closure device of FIG. 4.
Figure 4:
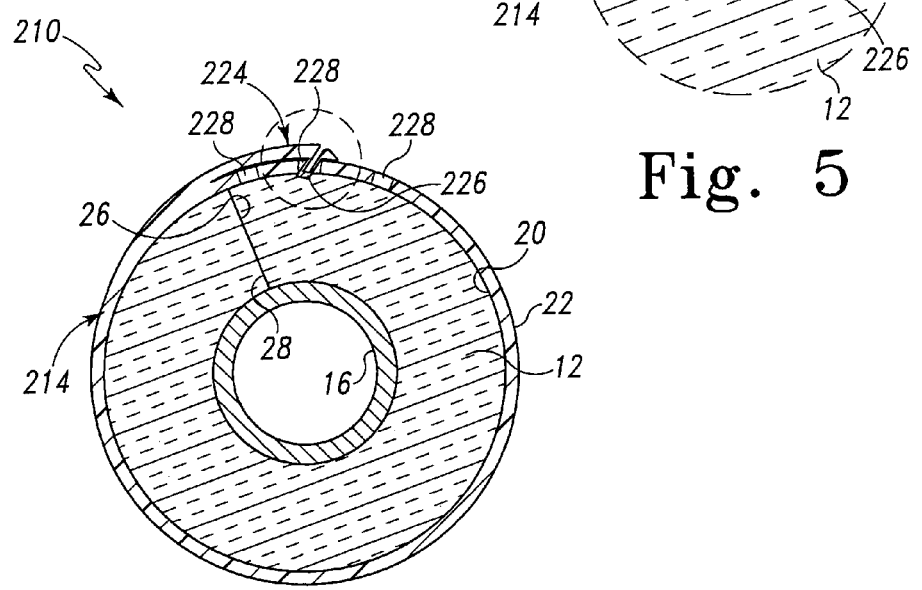
FIG. 4 is a sectional view of another pipe blanket wrapped about a pipe showing another closure device of the pipe blanket having a hook and eye closure means.

Looking now to FIGS. 4 and 5, yet another pipe blanket 210 is provided having a closure means including a flap 224 which includes one or more hooks 226 formed or punched into flap 224 of cover 114. Hooks 226 may also be coupled to an inner surface 20 of flap 124 or molded into flap 124 to protrude from inner surface 20. Further, multiple holes or slots 228 are formed through cover 214 near end 28. Illustratively, three slots 228 are shown through cover 214. However, it is within the scope of this disclosure for cover 214 to include any number of slots 228. The multiple slots 228 provided allow the user to adjust the pipe blanket 210 to fit pipes of different sizes. As shown in FIGS. 4 and 5, slots 228 are provided to receive at least a portion of hooks 226 therein to secure flap 224 to end 28 of cover 214. It is within the scope of this disclosure to provide several rows of holes or slots 228 so that pipe blanket 210 is circumferentially adjustable for use with pipes or tubes of varying diameters. Further, it is within the scope of this disclosure for a portion of cover 214 near end 26 of insulation 12 to be detached from insulation mat 12 to permit some edgewise compression to further accommodate structures of various diameters.

Looking now to FIG. 6, yet another pipe blanket 310 is provided having a jacket or cover 314 including an illustrative flap 324 and a flange 336 appended thereon. Illustratively, flange 336 has an elongated portion 338 and a rounded bulbous portion 340. Cover 314 is coupled to insulation mat 12 and notches 342 are punched into cover 314 near end 328 and are formed to receive flange 336 therein. Similar to flange 336, notches 342 include an elongated portion 344 and a bulbous portion 346. Illustratively, notches or channels 342 may be formed before cover 314 is coupled to insulation mat 12 or after. Further illustratively, a portion of each notch 342 is pressed into insulation mat 12. In use, facing surface 15 of insulation mat 12 is placed adjacent to a pipe 16 and blanket 310 is then wrapped therearound. To secure blanket 310 to the pipe 16, flange 336 is pushed into any one of the notches 342 available. Multiple notches 342 are provided so as to accommodate pipes of varying diameter. Although four notches 342 are shown, it is within the scope of this disclosure for cover 314 to include any number of notches 342 for receiving flange 326 therein to accommodate any number of sized pipes and/or other structures.

Looking now to FIGS. 7 and 7A, still another pipe blanket 410 is provided having an illustrative flap 424. Multiple detents 426 are coupled to and extend from inner or facing surface 20 of cover 414. To cooperate with and receive detents 426, cover 414 includes notches 428 formed in outer surface 22 near end 28 of insulation mat 12. As shown in FIGS. 7 and 7A, detents 426 are received within notches 428 to secure pipe blanket 410 about pipe 16. Any number of detents and notches may be provided to accommodate various pipe diameters and/or structures of other shape or size. The grooves or notches 428 may be formed into the cover 414 in one or more rows. Notches 428 may also be formed in the cover to extend into a portion of insulation mat 12, as shown in FIG. 7A, for example. Further, protrusions or detents 426 of flap 424 are formed to be snapped and locked within notches 428. An alternative detent or hook 427 is shown in FIG. 7B. Also shown in FIG. 7 is a wicking cloth 430 surrounding pipe 16 and coupled to a facing surface 15 of insulation mat 12. Wicking cloth 430 may be incorporated to draw out moisture which may collect around pipe 16. Although wicking cloth 430 is shown with pipe blanket 410, it is within the scope of this disclosure to use a wicking cloth with any of the pipe blankets described herein.

Figure 8:
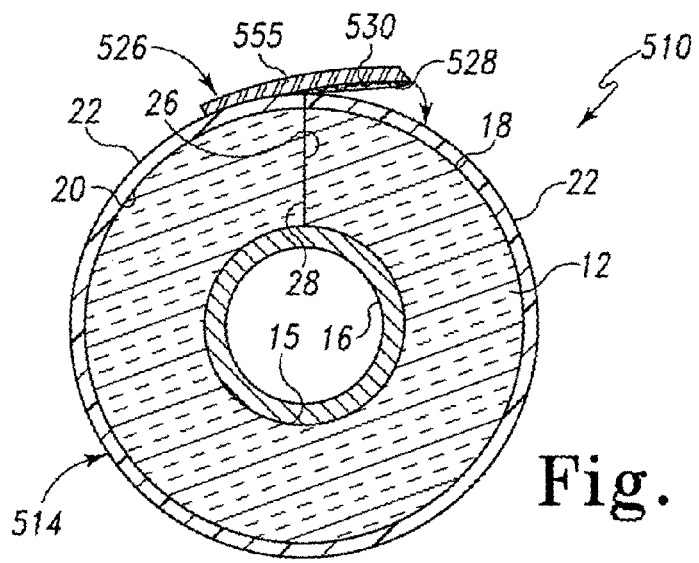
FIG. 8 is a sectional view of another pipe blanket wrapped about a pipe showing another closure device including a joint cover pre-bonded to one end of the cover and including a removable release strip and adhesive for bonding to the other end of the cover once the pipe blanket is wrapped around the pipe.

Yet another pipe blanket 510 is illustrated in FIG. 8. A cover 514 of pipe blanket 510 does not include a flap of the outer cover extending beyond end 26 or end 28 of insulation mat 12. Rather, a joint cover or seal 526 is provided for placement over the joint created between ends 26, 28 of the insulation mat and the outer cover. Illustratively, a portion of a body 555 of joint cover 526 is bonded to outer surface 22 of cover 514 near end 26. The remaining portion of joint cover 526 includes a releasable strip 528 covering adhesive 530. Joint cover 526 is, therefore, not congruous with cover 514 and may be applied after the manufacture of cover 514. Because cover 514 does not include a flap extending beyond the width of insulation mat 12, the cover 514 and insulation mat 12 combination may be cut with square edges to the desired width during manufacture of the pipe blanket 510 as well as at the customer's job site, for example. The other portion of joint cover 526 may then be bonded to outer surface 22 of cover 514 near end 28 of insulation mat 12. Although many of the pipe blankets disclosed herein are illustrated to wrap around only one circumference of pipe 16, it is within the scope of this disclosure for the illustrative pipe blankets to be wrapped about pipe 16 multiple times, for example, until a desired insulation thickness is achieved.

Figure 8B:
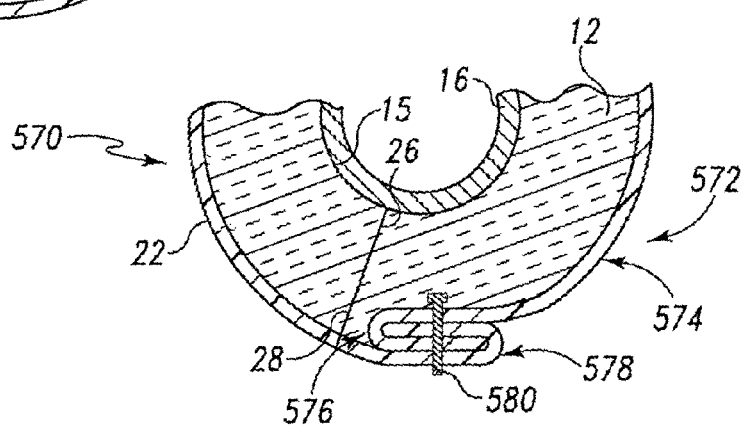
FIG. 8B is a sectional view of another pipe blanket wrapped about a pipe showing another device including a pretensioned first end portion of the cover which interlocks with a pretensioned second end portion of the cover to form a self-closing and overlapped seam.
Figure 8A:
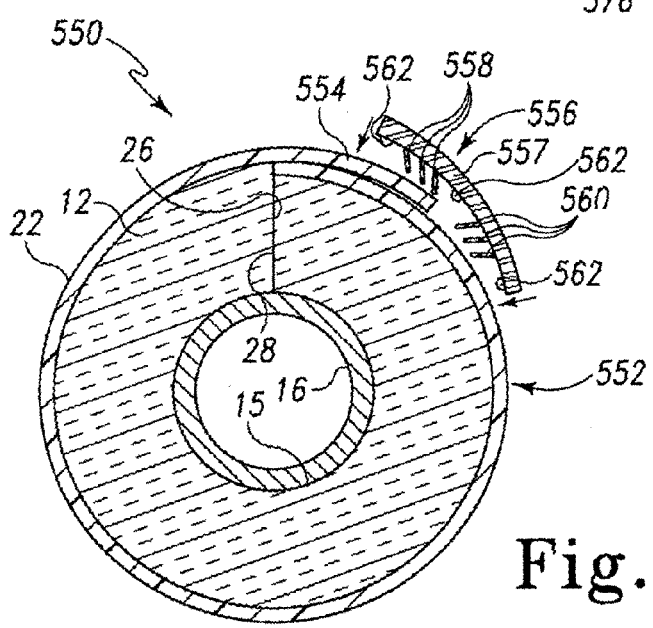
FIG. 8A is a sectional view of another pipe blanket wrapped about a pipe showing another closure device including a joint cover having seal adhesive beading as well as directional hooks or barbs to grip opposite ends of the cover of the pipe blanket once the pipe blanket is wrapped around the pipe.

Still another pipe blanket 550 is illustrated in FIG. 8A. Illustratively, a cover 552 of pipe blanket 550 includes a flap 554 which extends beyond end 26 of insulation mat 12. A joint cover 556 is provided is provided to secure flap 554 to an outer surface 22 of cover 552 near end 28. Joint cover 556 may also secure a joint created between ends 26 and 28 where a particular cover does not include a flap, such as cover 510 shown in FIG. 8. Illustrative joint cover 556 includes body 557 and a first set of barbs, tacks, or hooks 558 and a second set of such barbs, tacks, or hooks 560. First and second sets of barbs 558, 560 are positioned to lie inwardly at a non-perpendicular angle to body 557 and are pointed substantially toward a center of body 557, as shown in FIG. 8A. The barbs 558 and 560 are directional to aid in holding the ends 26, 28 of blanket 550 together and to hold flap 554 securely to cover 552 as shown. The barbs 558, 560 are provided to puncture through or at least partially through the cover 552 of blanket 550 to secure ends 26 and 28 to each other to thus secure the pipe blanket 550 about pipe 16. Cover 552, therefore, is not provided with any particular notches for receiving the barbs 558, 560 therein; however, it is within the scope of this disclosure for cover 552 to include such notches for receiving the barbs 558, 560 therein. As mentioned above, and discussed in greater detail below, cover 552, as well as other covers disclosed herein, may be formed to be sufficiently tear-resistant to withstand being coupled about a pipe by the various closure means and fasteners also disclosed herein.

One or more seal adhesive beads or strips, such as adhesive strip 562, may also be provided, as illustrated, to further couple joint cover 556 to outer surface 22 of cover 552, as shown in FIG. 8A. The adhesive 562 may be semi-permanent to permit the user to lift and reposition the joint cover 556 as desired. The adhesive 562 may also be formed or provided to strengthen over time and/or be set with heat, pressure, and/or a catalyst, for example. The body 557 of joint cover 556, as well as the body 555 of joint cover 526, shown in FIG. 8, may be made of a material having a low permeability to prevent moisture from leaking in our out. Joint covers 556, 526 may each be used to secure both standing seams, as shown in FIG. 8 or lap seams, as shown in FIG. 8A, for example.

A self-sealing closure means or device 570 is shown in FIG. 8B. Illustratively, a pipe blanket 572 includes a cover 574 having pretensioned, self-sealing end flaps 576, 578. Each flap 576, 578 has sufficient rigidity and strength to be folded over, and to remain folder over, for interlocking coupling with the other respective one of the flaps 576, 578. Illustratively, a fastener 580 may be used to further coupled flaps 576, 578 to each other, although, it is within the scope of this disclosure to provide flaps 576, 578 which remain interlocked with each other without the use of a fastener 580. Thus, a self-closing edge may be provided to replace the need for a separate mechanical latch. Each flap 576, 578 may be pretensioned such that each flap 576, 578 is biased toward the folded position shown in FIG. 8B. Adhesive (not shown) may also be applied to the appropriate portions of flaps 576, 578.

Figure 9:
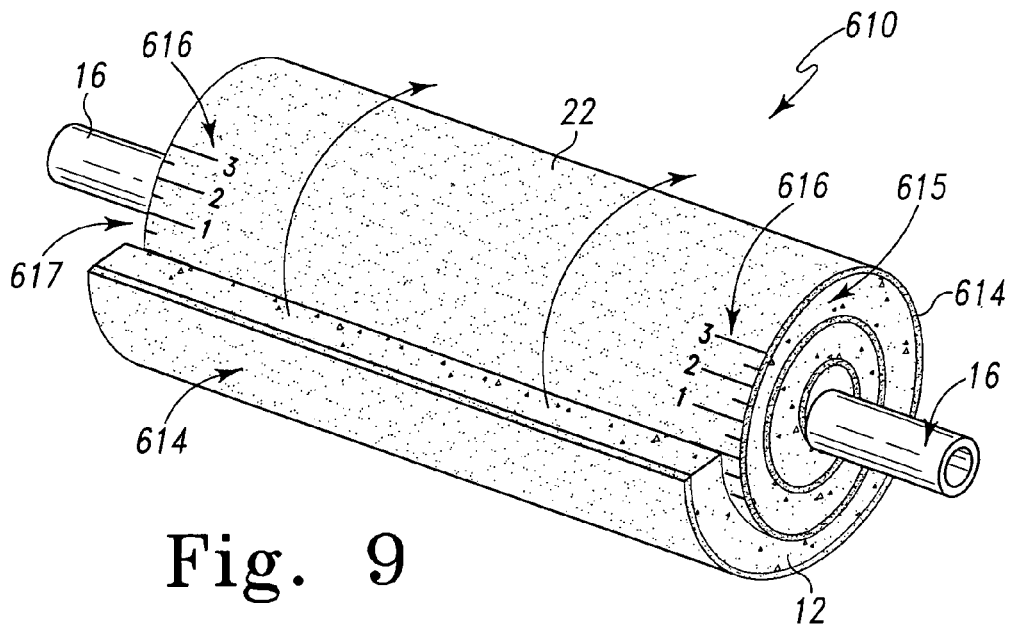
FIG. 9 is a perspective view of another pipe blanket including index marks on an outer surface of the cover to indicate a thickness of the insulation about the pipe.
Figure 10:
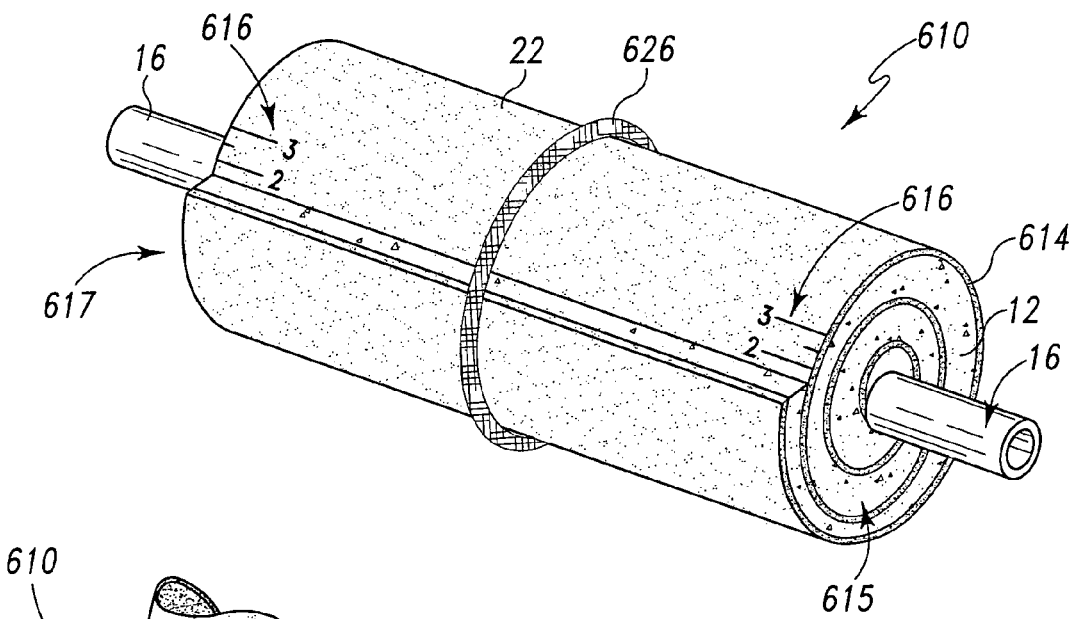
FIG. 10 is a perspective view of the pipe blanket of FIG. 9 showing another closure device including an adjustable band or strap securing the blanket about the pipe.

Looking now to FIGS. 9 and 10, another illustrative pipe blanket 610 is provided including insulation mat 12 and an alternative outer cover 614. Cover 614 includes index marks 616 on outer surface 22 to indicate the width of pipe blanket 610. As shown in FIGS. 9 and 10, the index marks 616 are located at each end 615 and 617 of blanket 610 to help indicate, without the need to measure, the width of pipe blanket 610 needed or desired to insulate a certain pipe 16 of a particular size a certain thickness of the insulation mat. For example, the index marks 616 may indicate to an installer an appropriate closure point of the pipe blanket for a one-inch pipe requiring two inches of insulation wrapped therearound. Index marks 616 may also be used by the customer to indicate squareness to a user installing the blanket 610 about a pipe, such as pipe 16, for example. After cutting blanket 610 to length, blanket 610 may be wrapped several times about pipe 16 to create the desired thickness of insulation about pipe 16, as shown in FIGS. 9–10, for example. As mentioned above, it is within the scope of this disclosure to wrap any of the pipe blankets disclosed herein one or more revolutions about a pipe to obtain the desired insulation thickness. Once pipe 16 is wrapped, a closure device or means such as a strap 626 is used to secure pipe blanket 610 in place. Strap 626 may be adjustable for use with pipes of varying diameters. The joints, laps, and ends of blanket 610 may be taped or otherwise secured with fasteners after installation to encapsulate blanket 610. Further, additional index marks may be provided along the length of blanket 610 so that blanket 610 may be cut along both the length and/or the width dimension prior to wrapping about pipe 16.

Figure 11:
FIG. 11 is a perspective view of a pipe blanket secured about a pipe by an elastic spring, similar to the strap of FIG. 10.

Similar to strap 626, an elastic spring or band 650, such as that shown in FIG. 11, may be used to secure a pipe blanket about pipe 16. Elastic band 650 is wrapped around pipe blanket 610 to compress the pipe blanket 610 shut about the pipe 16 or object to be insulated. The ends (not shown) of the strap 626 or band 650 may include hooks, barbs, ties, Velcro™, or another suitable clasps or fasteners.

Figure 12:
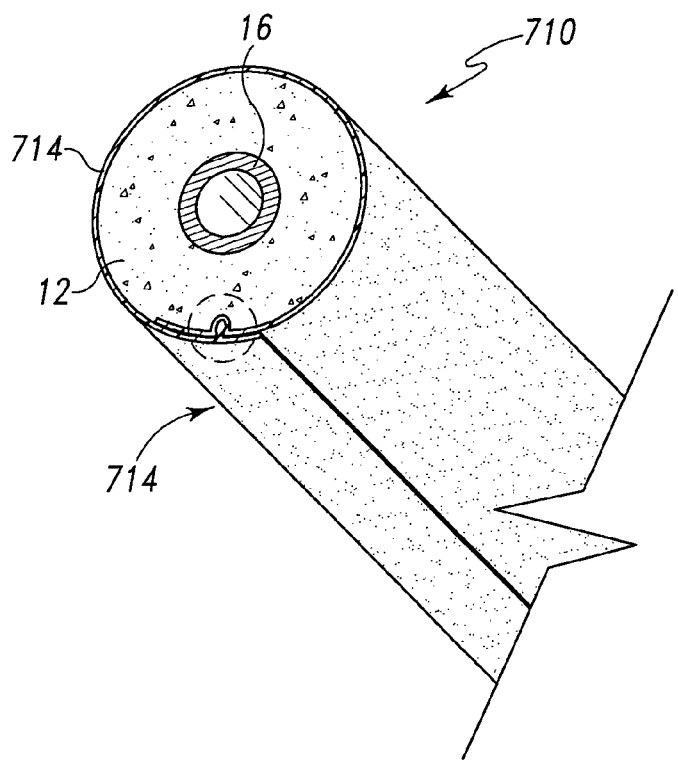
FIGS. 12 and 13 show yet another pipe blanket having a detent or raised bead along a length of one end of the cover and a groove along the length at the other end of the cover for receiving the detent therein to secure the pipe blanket about the pipe.
Figure 13:
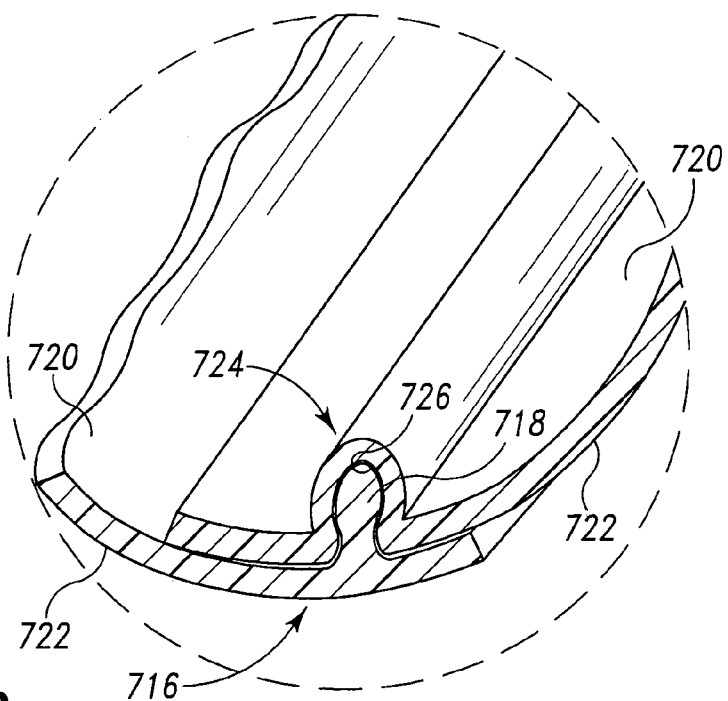

Looking now to FIGS. 12 and 13, another illustrative pipe blanket 710 is provided including insulation mat 12 and a jacket or cover 714. A first end portion 716 of cover 714 includes a raised bead or detent 718 which runs along a length of pipe blanket 710, as shown in FIG. 13. Detent 718 is coupled to, and extends outwardly from, an inside or facing surface 720 of cover 714. Facing surface 720 of cover 714 faces and is in contact with insulation mat 12 of pipe blanket 710. Cover 714 also includes an outer surface 722. A second end portion 724 of cover 714 is formed to define a groove or pocket 726 for receiving detent 718 therein. During installation, therefore, pipe blanket 710 is secured about illustrative pipe 16 by snapping detent 718 into groove 726 in a similar way that many commercial sandwich baggies are sealed closed.

It is also within the scope of this disclosure to provide a pipe blanket (not shown) including a hook and loop fastener or closure system, similar to that shown in FIGS. 1 and 2. For example, one or more straps may be coupled to an outer surface of the cover of the pipe blanket which each correspond to portions of looped fabric so that the straps are able to "grab" the fabric and securely couple the blanket about a pipe. The strap or straps may include elastic fabric or film to allow the strap or straps to stretch and compress the insulation as it is being secured about a pipe. The hooks or teeth of the strap may be metal, organic, or plastic. Additionally, various hooked or looped straps may be coupled directly to a cover having a suitable fabric (without the need for corresponding hooked or looped straps). Further, if a cover of the blanket is made of a type of fabric, the fabric may be treated with a repellant to repel liquids or a surfactant to carry away any moisture which may accumulate. The insulation of such a pipe blanket, or any pipe blanket, may also be treated on the surface or throughout to repel moisture.

Figure 14:
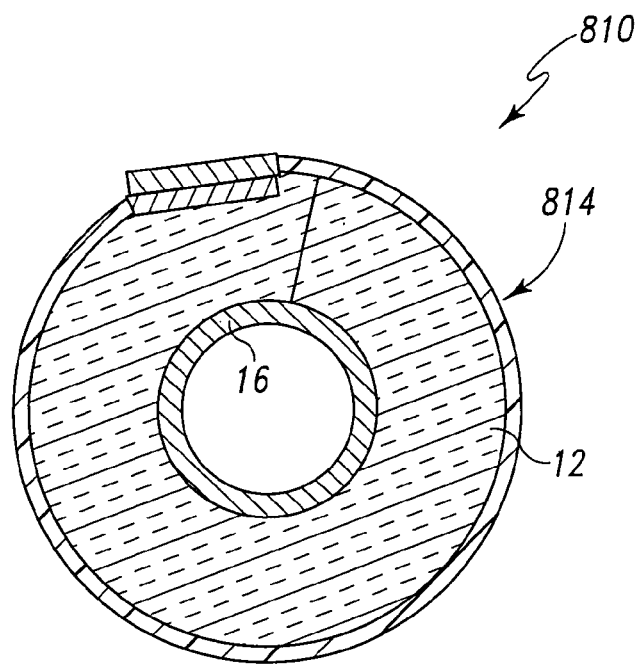
FIG. 14 is a sectional view of another pipe blanket secured about a pipe showing the blanket including rigid strips at opposite ends of the cover which are coupled to each other to secure the pipe blanket about the pipe.
Figure 15:
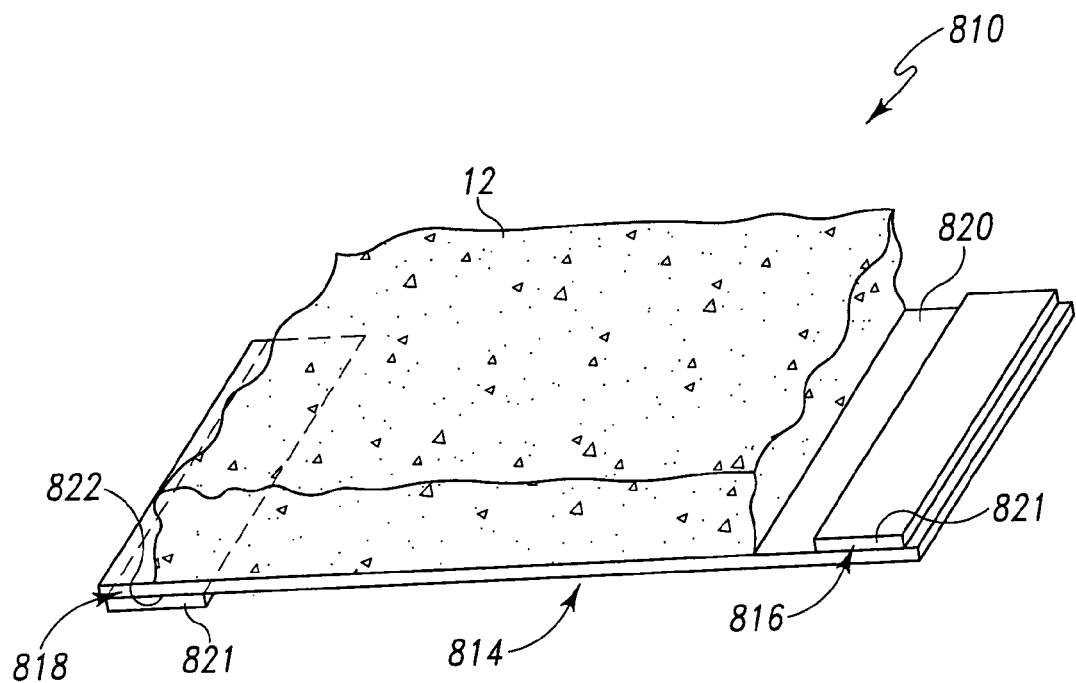
FIG. 15 is a perspective view of the unrolled pipe blanket of FIG. 14 showing each rigid strip including self-seal tape.

As shown in FIGS. 14 and 15, yet another pipe blanket 810 is provided showing a cover 814 of the blanket 810 including a first rigid flap 816 at a first end and a second rigid flap 818 at a second end. Each flap 816, 818 is made of a material less flexible than the material of the cover 814. In other words, the cover 814 is more flexible than the flaps 816, 818. Flap 816 has adhesive 821 applied to a facing or inside surface 820 while flap 818 has adhesive 821 applied to an outer surface 822. A removable adhesive strip (not shown) may cover the adhesive 821. Alternatively, a strip of self-seal tape may be coupled to each flap 816, 818. During installation, pipe blanket 810 is wrapped around pipe 16 to the desired circumference. The user may align the two rigid flaps 816, 818 and then seal the lap joint. Flaps 816, 818 make it possible to maintain a uniform diameter from end to end and also aid in pressing and sealing the joint.

Figure 16:
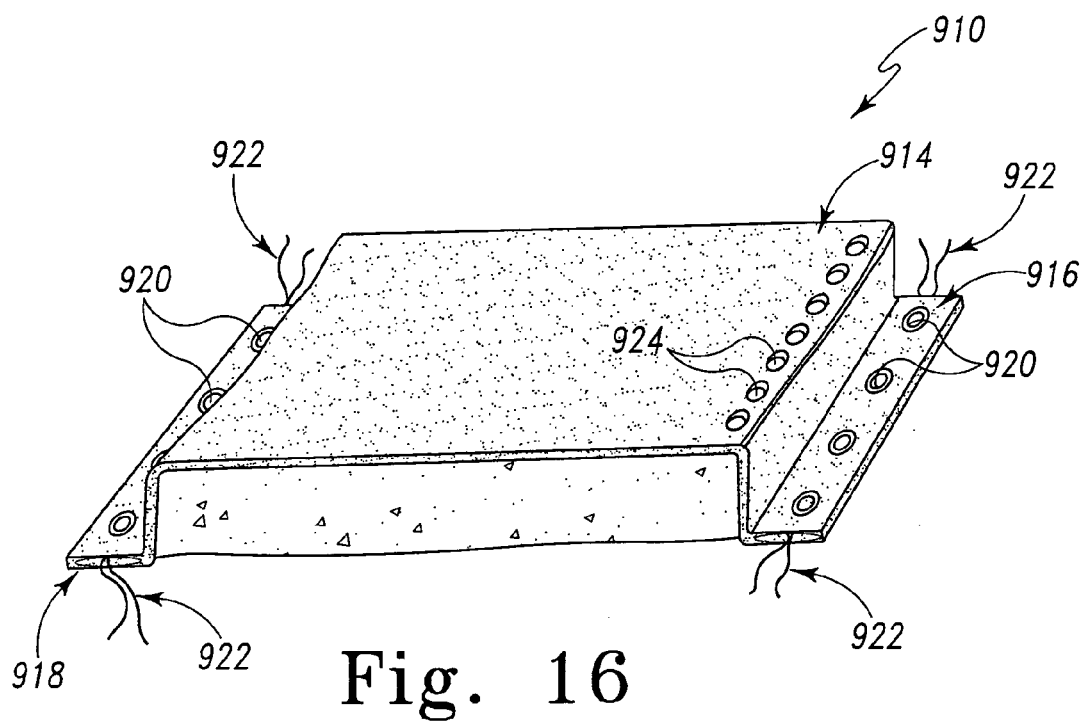
FIG. 16 is a perspective view of another pipe blanket showing a flap of the cover having a drawstring therein to secure each end of the pipe blanket to a pipe fitting or piece of equipment which may change in diameter along its length.
Figure 17:
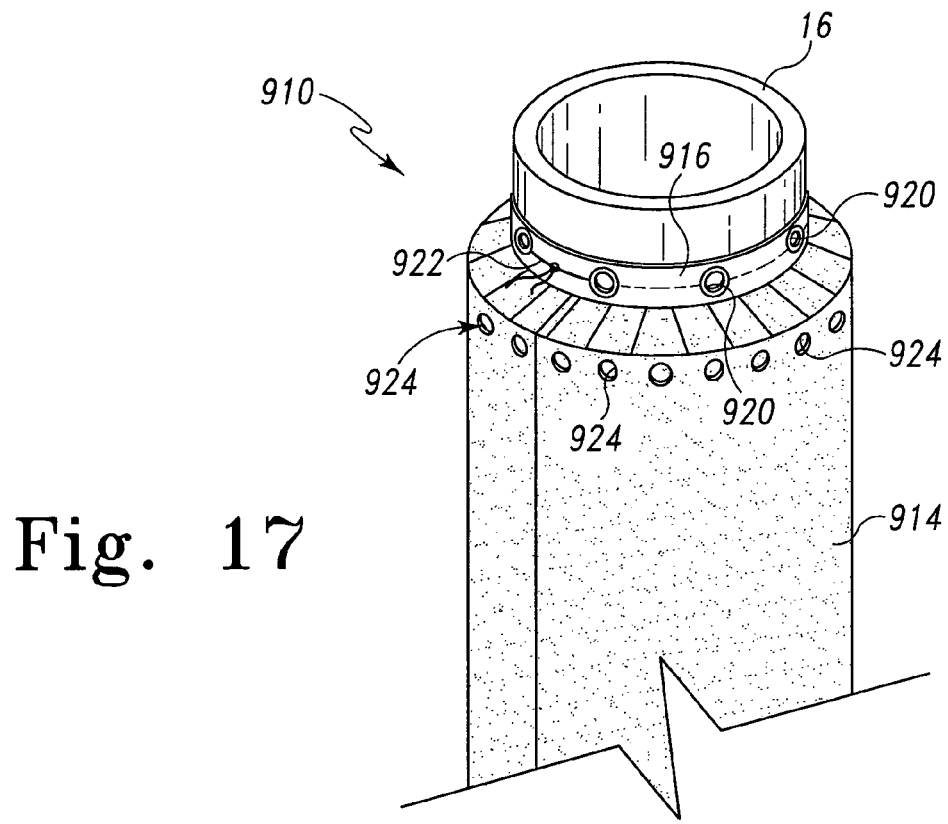
FIG. 17 is a perspective view of a portion of the pipe blanket of FIG. 16 showing the pipe blanket secured about a pipe with the use of the drawstring.

Looking now to FIGS. 16 and 17, yet another pipe blanket 910 is provided having a cover 914 including flaps 916, 918 along a width of pipe blanket 910 (rather than a length, as illustrated in some previous embodiments). As shown in FIG. 16, each flap 916, 918 includes eyelets 920 or reinforcement holes. Cover 914, including each flap 916, 918, is made of a water resistant material. Each flap 916, 918 is generally hollow creating a passageway therethrough and includes a drawstring 922 received at least in part through the passageway. Drawstring 922 may be made of wire, string, twine, polymeric threads, or other suitable materials. When pipe blanket 910 is installed and is positioned around pipe 16, as shown in FIG. 17, for example, first and second ends of drawstring 920 are pulled taught and tied together to secure pipe blanket 910 about pipe 16. Illustratively, drawstring 920 may operate similarly to a drawstring in a standard garbage bag, for example. Eyelets along a seam created where the two ends of pipe blanket 910 meet may have a cord or wire threaded therethrough. The cord or wire may be drawn taut through the eyelets to close the seam, for example. It is also within the scope of this disclosure to close the seam through the use of any of the closure means described herein. The drawstring 922 of the pipe blanket 910 shown in FIGS. 16 and 17 is provided herein to secure each end of the pipe blanket 910 to a pipe fitting or piece of equipment which may change in diameter along its length. Further illustratively, cover 914 is shown in FIG. 17 to include vent holes or weep holes 924 so that any accumulated moisture about pipe 16 may be removed therethrough. Insulation mat 12 may also be contained within a wicking cloth (not shown) to cooperate with weep holes 924.

Figure 30A:
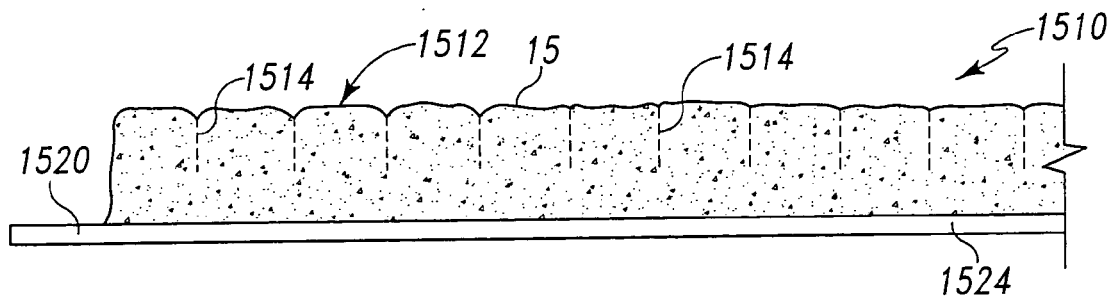
FIGS. 30A–30D are sectional views showing a pipe blanket having a pre-scored insulation mat to allow the installer to cut the insulation mat to a desired width and remove a portion of the insulation mat as needed to create a closure flap for securing the pipe blanket about a pipe.

As discussed above, the pipe blankets disclosed herein are provided to fit a variety of pipe sizes by way of overlapping the pipe blanket with itself, stretching the pipe blanket, and/or compressing the pipe blanket. It is also within this disclosure to fit the pipe blanket to a particular pipe by way of cutting a width the pipe blanket to fit the diameter of the particular pipe to be covered. Looking now to FIGS. 30A–30D, yet another means of adjusting the width of a pipe blanket to accommodate pipes of various sizes is provided. The length of the pipe blanket may also be cut, as needed, by the customer. As shown in FIG. 30A, a pipe blanket 1510 is provided. An insulation mat 1512 of the pipe blanket includes perforations, pre-cuts, or scores 1514 through portions of the insulation mat 1512. These pre-cuts 1514 may be formed in the insulation mat 1512 after the insulation mat 1512 has been attached to an outer cover 1524 of the pipe blanket 1510. As is discussed below, these pre-cuts 1514 assist the customer or end-user in removing strip-like portions 1516 of the insulation mat 1512 as desired to adjust the width of the pipe blanket 1510.

Figure 30B:
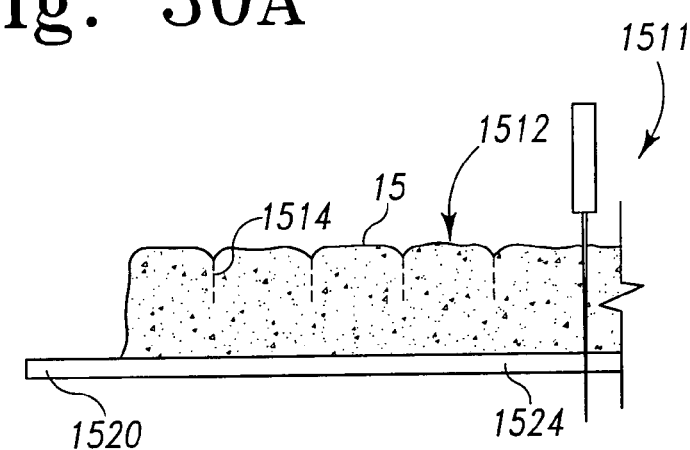
Figure 30C:
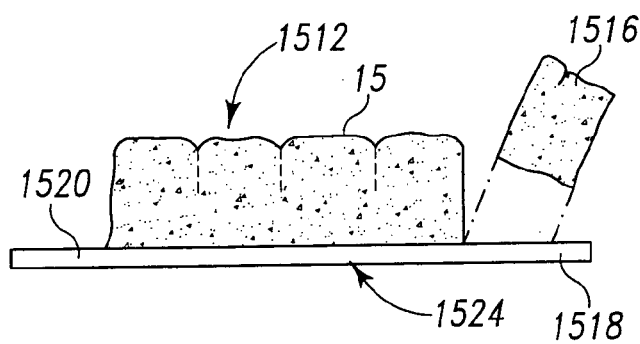
Figure 30D:
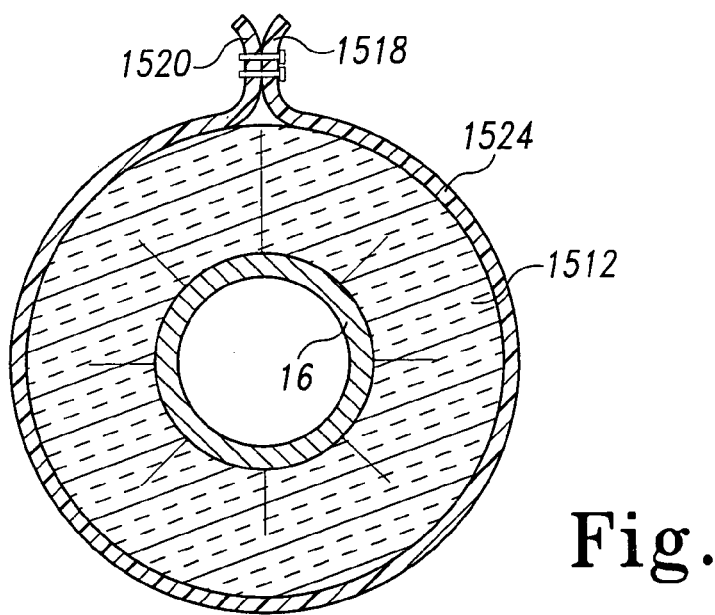

In use, once the customer unrolls the pre-scored pipe blanket 1510, the customer may customize the pipe blanket 1510 by first cutting the width of pipe blanket 1510 using a cutting tool 1511, as shown in FIG. 30B, to fit substantially the outer diameter of a particular pipe to be covered. As mentioned above, the customer may also cut the length of the pipe blanket 1510 as needed. Looking now to FIG. 30C, it is shown that after the width of pipe blanket 1510 has been cut, a pre-scored strip 1516 of insulation mat 1512 is removed to expose a flap 1518 or portion of the closure means to be used by the customer when securing the pipe blanket 1510 about a pipe. Another flap 1520 of cover 1524 is provided at an opposite end of the insulation blanket 1510. When wrapping customized pipe blanket 1510 about pipe 16, as shown in FIG. 30D, the flaps 1518, 1520 may be secured to each other about the pipe 16 with the use of a fastener 1522 such as a tie, staple, rivet, clasp, etc. Thus, as shown by FIGS. 30A–30D, the width of pre-scored pipe blanket 1510 is adjustable by the customer to provide a pipe blanket 1510 for use with pipes of varying outer diameters.

Providing a pipe blanket that is flexible over a range of pipe sizes and thickness allows the customer to order pipe blankets in bulk and may eliminate the need for customers at a particular job site to order insulation or pipe blankets to fit their particular and exact needs. Further, as is discussed in more detail below the pipe blanket 1510 shown in FIGS. 30A–30D is formed such that the inner, facing surface 15 of the pipe blanket 1510 may be pleated to provide an insulation mat 1512 which is conformable about pipes and provides for more minor adjustments to be made to allow the pipe blanket to fit different pipes of similar, but different diameters. In other words, pipe blanket 1510 which is cut to one particular width, for example, is able to wrap about pipes of various pipe diameters. Pleated pipe blankets as well as the pleating process will be discussed in greater detail below.

As mentioned above, the insulation mat of the pipe blankets disclosed herein may be formed to more easily or naturally conform to and/or wrap around a pipe in order to ease the difficulty and work which the installer may face when insulating pipes. The illustrative insulation mats disclosed herein are formed to be conformable about a longitudinal axis along a length of the pipe blanket by various means for conforming to or circularizing a pipe. These means include, but are not limited to, pleats or pleating of the insulation mat, differentiated fiber orientation between a first or inner region and a second or outer region of the insulation mat, and density and/or property differentiation between the first and second regions of the insulation mat. These conforming means are discussed in greater detail below.

Various outer covers and closure means (including fasteners, flaps of the outer cover, as well as joint covers) are described herein. It is within the scope of this disclosure to include a outer cover, flap, and/or joint cover which is strengthened or reinforced for use with various fasteners such as staples, rivets, clips, etc. The outer cover, flap, and/or joint cover is formed to be tear-resistant and is formed to prevent breaking when sharply bent (as around a small pipe, for example) but which remains cut-able when using a suitable sharp tool such as scissors or a knife or blade typically used to cut through insulation mats. The outer covers, flaps, and joint covers disclosed herein may be formed to resist the tearing or pulling out of the fasteners and closure means holding the pipe blanket about a pipe or other structure. The reinforcement provided may be continuous such as by lamination or the addition of another layer of material and/or may be provided by discrete strands or yarns throughout the outer cover, flap, and/or joint covers disclosed herein.

Each outer cover, flap, and/or joint cover may include a reinforcement layer including a polymer and/or glass fibers. These glass fibers may be thermally bonded together or may be bonded together with a binder. Factors such as the fiber diameter, binder type, and thickness of such layer determine whether the reinforcement layer will bend generally smoothly or will break at random intervals when bent or wrapped about a pipe. This layer may also contain a fire retardant agent. A film layer is coupled to the reinforcement layer to form the exterior surface of the cover. The film or laminate layer provides abuse-resistance, a vapor barrier, drip protection, and appearance. The film may be sufficiently thick to minimize tool and hand damage when pipe blanket is being handled and/or installed. The film is bonded to the reinforcement layer using an adhesive. This adhesive may also contain fire retardant agents. It is also within the scope of this disclosure to provide an outer cover having a paper exterior, a layer of an open and loosely bonded cloth-like material or yarn, and adhesive for bonding a thin aluminum foil layer to provide the vapor barrier.

A coating may be applied to either both the outer cover or the fastener, such as a staple, for example. This coating may be sufficiently flexible or fluid to seal around any punctures a fastener may make through the outer cover when securing the pipe blanket about a pipe. This coating acts to maintain the vapor barrier characteristics of the outer cover.

Figure 18:
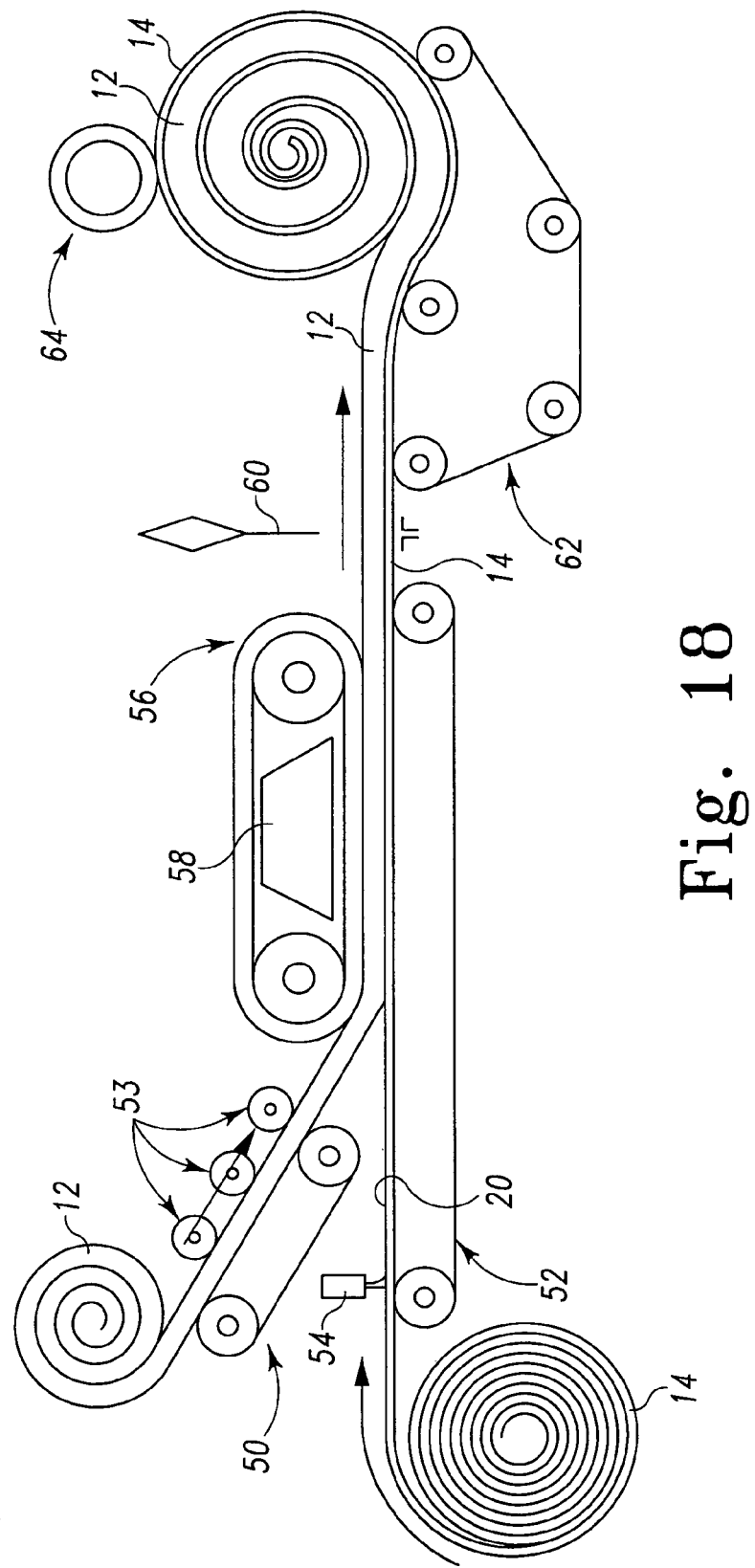
FIG. 18 is a schematic view of an assembly process for coupling the cover of a pipe blanket to the insulation mat of a pipe blanket showing an adhesive being applied to the cover prior to bonding the cover to the insulation mat.

Looking now to FIG. 18 an assembly process for pleating a cured insulation mat and for coupling an illustrative cover, such as those covers disclosed above, for example, to the pleated insulation mat is provided. It is also within this disclosure, as is discussed in greater detail below, to pleat an uncured insulation mat. For illustrative purposes only, FIG. 18 shows cover 14 being coupled to insulation mat 12. As shown in FIG. 18, insulation mat 12 is unrolled along conveyor belt 50 to lie on "V-shaped" conveyor belts 52. Alternatively, insulation mat 12 may come directly from a fiber glass manufacturing process. Illustratively, wheels 53 are provided to press the insulation 12 between the belts 52 to create pleats, as shown and discussed in greater detail below with reference to FIGS. 19–20D. Cover 14 is unrolled onto conveyor belt 52 as well after an adhesive applicator 54 applies adhesive to inner surface 20 of cover 14. Insulation mat 12 and cover 14 then meet and are squeezed between a moving compression belt 56 and conveyor belt 52 while a heater 58 cures the adhesive applied to cover 14 to permanently bond cover 14 and insulation mat 12 together. After passing through compression belt 56, the insulation mat 12 and cover 14 combination is passed under a cutter or chopper 60 which may slice the insulation mat 12 and cover 14 combination (or pipe blanket 10) at a desired length. The insulation mat 12 and cover 14 combination is then passed between conveyor belt 62 and rotating drum 64 to wind-up blanket 10 for storage and/or shipping.

FIG. 18A illustrates another assembly process for pleating the cured insulation mat 12 and coupling the insulation mat 12 a cover 14. Further, a sectional view of an illustrative pleated insulation mat 12 is shown in FIG. 18B as well. The assembly process shown in FIG. 18A is similar to that shown in FIG. 18; thus, like reference numerals have been used to represent like components.

Figure 19:
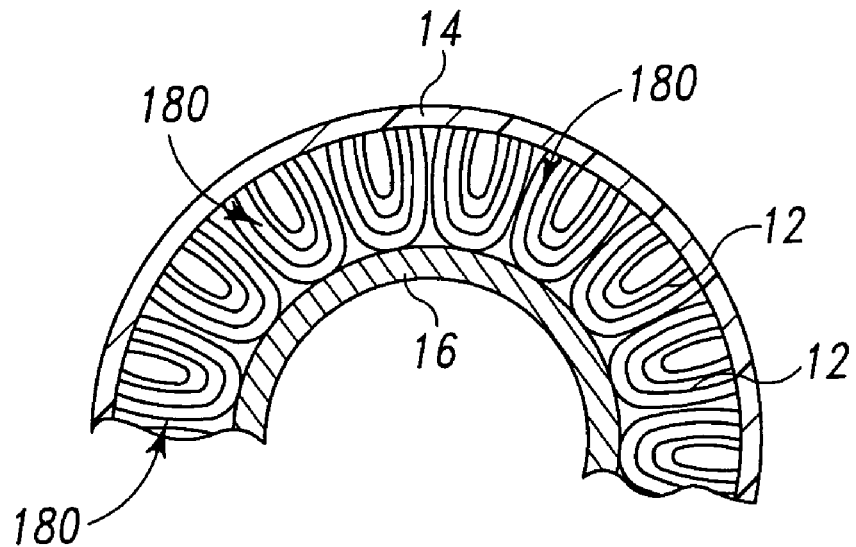
FIG. 19 is a sectional view of a portion of another pipe blanket secured about a pipe showing the insulation mat of the pipe blanket having been folded multiple times to create pleats and showing each outside fold or pleat having been cut to create a more resilient insulation mat having increased compressive resistance when wrapped around a pipe.

Pleating, as discussed above with respect to FIGS. 18 and 18A creates pleats 180 (shown in FIGS. 19–20D) which may be formed in a cured or uncured insulation mat 12. These pleats 180 provide a resilient and conformable insulation mat 12 in addition to having compressive outer resistance when wrapped around a pipe, for example. Pleating of the insulation mat 12 increases the flexibility of the insulation mat 12 and allows the insulation mat 12 to be more easily wrapped about a pipe 16, for example. One way to make the insulation mat 12 more resilient, therefore having more body, is to pleat the insulation mat and then cut the pleats as illustrated in FIG. 19, for example. As shown in FIG. 19, insulation mat 12 has been folded back and forth to create pleats 180. Pleats 180 act to provide added stiffness to the insulation mat 12 as well as greater conformity about the pipe 16.

Figure 20:
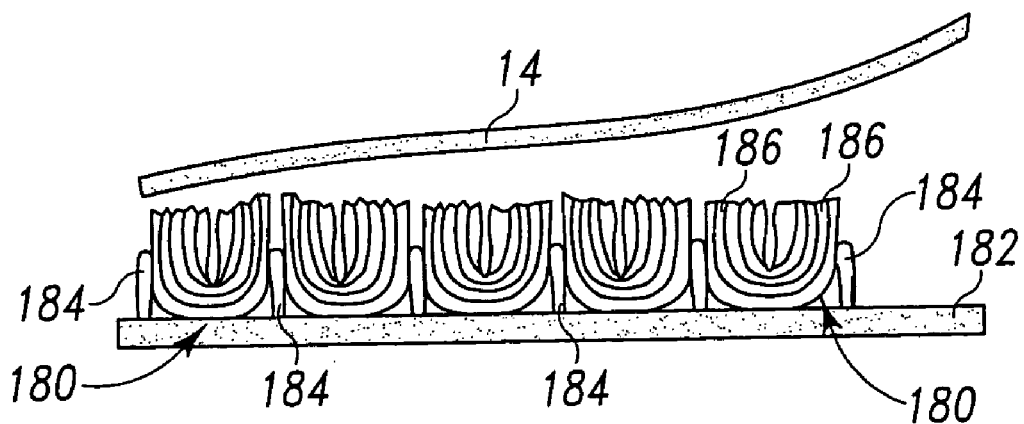
FIG. 20 is a sectional view of the pipe blanket of FIG. 19 showing the formation of the pleated pipe blanket by folding the insulation mat onto a base between protruding rods and cutting the insulation mat at the location of each rod prior to applying adhesive to the exposed ends of the insulation mat, attaching a cover thereon, allowing the adhesive to dry, and removing the pipe blanket from the base and rods.

The outer folds or pleats 180 of the insulation mat 12 shown in FIG. 19 have been cut to create smaller "U-shaped" portions of insulation mat 12. It is also within the scope of this disclosure to cut the inside folds 180 so that the open edges of insulation 12 face pipe 16. One means of forming a pipe blanket such as that shown in FIG. 19 (including pleats 180) is to provide a base 182 with spaced apart rods 184 appended therefrom. As shown in FIG. 20, an unpleated insulation mat 12 is tucked between rods 184 and partially or totally cut at the top of each rod 184. Cut edges 186 are then dabbed with an adhesive, such as foamed Imperial 9194, for example, and illustrative covering 14 is applied thereto and weighed down for drying. The adhesive may be a flexible air dry emulsion, contact, or hot melt type of adhesive as well, for example. Once the adhesive has dried, cover 14 and pleated insulation mat 12 are lifted away from base 182 and rods 184. It is within this disclosure to attach cover 14, or any of the covers disclosed above, to insulation mat 12 with pleats 180 using any type of adhesive and/or tacking, etc. In an alternative embodiment shown in FIG. 20A, the folds or pleats 180 are not cut and are, therefore, continuous. The adhesive is applied to the topmost folds of each pleat 180 and cover 14 is coupled thereto.

Looking now to FIGS. 20B and 20C, another method for pleating a pipe blanket is provided. FIGS. 20B and 20C disclose a method for pleating an uncured insulation mat, for example. It is within this disclosure for all pleated insulation mats disclosed herein to be formed by the method of pleating an uncured insulation mat. Although, as discussed above, an already cured insulation mat may be pleated as well. As shown in FIGS. 20B and 20C, a conveyor belt 200 is provided. The conveyor belt 200 is moving to the right as shown in FIG. 20B and indicated by reference numeral 202. Multiple rotating disks 204 are provided for forming the pleats 180 in insulation mat 12 as insulation mat 12 moves down the conveyor belt 200.

Disks 204 and wheels 53 operate in the same or similar manner to create pleats 180. Disks 204 are spaced-apart from each other along a width 206 of conveyor belt 200, as shown in FIG. 20C. Disks 204 are coupled to a pipe 208 for rotation with or about pipe 208 in a counter-clockwise direction, as shown in FIG. 20B. Illustratively, three disks 204 are provided across width 206 of conveyor belt 200. It is within the scope of this disclosure, however, to provide any suitable number of rotating disks for forming any suitable number of pleats 180 within insulation 12. Rib members 211 are coupled to conveyor belt 200, as shown in FIG. 20C, in spaced-apart relation to each other. Illustratively four rib members 211 are provided. Further illustratively, each disk 204 is substantially centrally positioned between a pair of rib members 211. Disks 204 optionally may be heated to provide partial curing of the fiber glass mat as the pleats are being formed. The use of rib members 211 is optional.

Illustratively, insulation mat 12 is placed onto the conveyor belt 200 to proceed with conveyor belt 200 to the right, as shown in FIG. 20B. Portions of insulation mat 12 pass under each disk 204 and over each rib member 211 to form the desired pleats 180. The disks 204 operate to force at least a portion of the fibers of insulation 12 down between the spaced-apart rib members 211 to substantially change or alter the orientation of the fibers to create an overall sinusoidal or pleated wave-like effect. An overall thickness 213 of the insulation mat 12 is not substantially altered by the formation of the pleats 180 within the insulation mat 12. However, by forcing the fibers of the insulation mat 12 into a more sinusoidal or pleated position, the insulation mat 12 provides reduced resistance to compression and bending as the insulation mat 12 is rolled into a cylindrical position about a pipe. The formation of the pleats generally orients a number of the fibers in a more vertical or less laminar position.

The disks 204 may be positioned at varying heights above the conveyor belt 200 and at varying distances between one another depending upon the size of the pleats 180 desired by the manufacturer. Further, the size and spacing of the rib members 211 may be altered by the manufacturer as well. It is also within the scope of this disclosure to provide opposing and alternating sets of disks 204 above and below the insulation mat 12 as well in order to create a similar pleated effect on the fibers of the insulation 12 without the use of the rib members 211. Although disks 204 are shown and described above, it is within the scope of this disclosure to provide other suitable means of pleating an insulation mat such as providing a heated or non-heated profile or fixed set of bars or roller under which the insulation mat passes as the insulation mat travels down the conveyor belt, for example. Illustratively, the insulation mats described herein are pleated during the assembly process before the compression step described above with respect to FIGS. 18 and 18A. Illustratively, therefore, un-compressed insulation mats are be pleated herein. It is within the scope of this disclosure, however, to pleat already compressed insulation mats as well, for example.

Pleating of insulation mat 12 may further be accomplished through the use of air jets 250, as shown in FIG. 20D. An upper level 252 of air jets 250 and a lower level 254 of air jets 250 is provide through which insulation mat 12 of a pipe blanket may pass to create pleats 180 within the insulation mat 12. As discussed above, the pleats 180 allow the insulation mat 12 of the pipe blanket to more easily conform or be wrapped about a pipe when a particular pipe blanket having a pleated insulation mat is being fitted about a pipe, for example. The upper level 252 of air jets 250 includes an air supply manifold 256 connected to a compressed air supply 257 as well as multiple downwardly facing air jets 250. Similarly lower level 254 of air jets 250 includes a second air supply manifold 256 connected to a compressed air supply 259 as well as multiple upwardly facing air jets 250. Upper and lower levels 252, 254 are spaced-apart from each other to allow the insulation mat 12 to pass therebetween on a conveyor belt (not shown), for example.

Illustratively, insulation mat 12, shown in FIG. 20D, is moving in and/or out of the page (similar to the insulation mat shown in FIG. 20C). It is also within the scope of this disclosure, though, for insulation mat 12 to be moving to the left or right through the air jets 250. As shown, upper level 252 of air jets 250 are spaced-apart from each other. Lower level 254 of air jets 250 are spaced-apart from each other as well. Further, upper and lower levels 252, 254 of air jets 250 are interdigitated such that a lower level 254 is air jet 250 is substantially between two upper level 252 air jets 250 and visa versa.

In order to provide a less laminar lay of fibers, the air jets 250 create pleats 180 in insulation mat 12. This operation may occur in the assembly process after formation of the insulation mat 12 but before compression and curing, as discussed above. The jets 250 may be timed in some coordinated manner or operate continuously. Optionally, one may partially cure the insulation mat 12 of resin banded fibers prior to pleating the insulation mat 12 to change the fiber orientation. Partially curing the insulation mat 12 prior to pleat formation may provide pleats which set better than those formed in insulation mats which have not been partially cured.

As shown in FIG. 20D, a stream of hot jet air approximately 400–500° F. is used to create and partially set the pleats 180 in the insulation mat 12 pleats 180 as the pleats 180 are formed. The temperature range for the hot air emitted from the air jets 250 may be varied according to the specific type of binder and catalyst used on the insulation mat 12. The hot air acts to partially set or bind the insulation mat 12 in the pleated shape prior to heating and setting the insulation mat 12 fully as is discussed above with respect to FIGS. 18 and 18A. Although a hot stream of jet air is disclosed, it is within the disclosure to create pleats 180 within an insulation mat 12 using either hot, warm, or cold air emitted from the air jets 250.

Either a top portion of the insulation mat 12, a bottom portion of the insulation mat 12, or both top and bottom portions of the insulation mat 12 may be pleated in this manner through the use of air jets such as air jets 250, for example. In one embodiment, the conveyor belt may continuously move and the air jets 250 may continuously emit pressurized air. However, in another embodiment the conveyor belt may move in increments and/or the air jets 250 may spray intermittently. Illustratively, the conveyor belt moves the insulation mat 12 past the air jets 250 at a speed of approximately 120 feet/min. However, it is within the scope of this disclosure for the conveyor belt to move the insulation mat 12 past the air jets 250 at approximately 30–230 feet/min. Further, it is also within the scope of the disclosure to vary the speed at which the conveyor belt proceeds past the air jets 250 to alter the shape and dimensions of the pleats 180 created.

The air pressure for each jet 250 may illustratively be between approximately 1 and 10 psi. An air pressure of 5 psi has been found to successfully create pleats 180 within insulation mat 12. Illustratively, the stream of air emitted from the air jet may be a narrow stream of focused or non-diffused air. The air manifold may illustratively be 8–9 inches above and/or below the insulation mat 12. Air jets 250 may be spaced-apart approximately two inches apart from each other to create pleats 180 or grooves at a certain spacing along insulation mat 12. However, it is within the scope of this disclosure to space the air jets 250 other suitable distances apart from each other.

It is also within the scope of this disclosure to set the pleats formed in an already pleated insulation mat by running the pleated and uncured insulation mat through a different one of the pleating processes described above. For example, the insulation mat may be initially pleated by the air jets 250. These pleats may then be set by running the insulation mat under disks 204, for example, prior to curing the pleated insulation mat. In other words, the insulation mat may be run multiple times through multiple pleating processes to form and set the pleats within the insulation mat. Once the pleats are formed and set, a heat source is provided to cure the insulation mat with the pleats formed therein.

Another means for making an insulation mat more flexible for fitting about a pipe is to cut the inside or facing surface of the insulation (not shown). For example, the insulation mat may be cut along parallel lines up to approximately 80–90% through a thickness of insulation mat with each cut being spaced about two inches apart from an adjacent cut. In use, as the cut insulation mat 12 is wrapped about a pipe, the cut fibers at the inside surface are urged to bend and fold at the cuts making it easier for a user to bend and wrap the insulation mat about the pipe.

Figure 21:
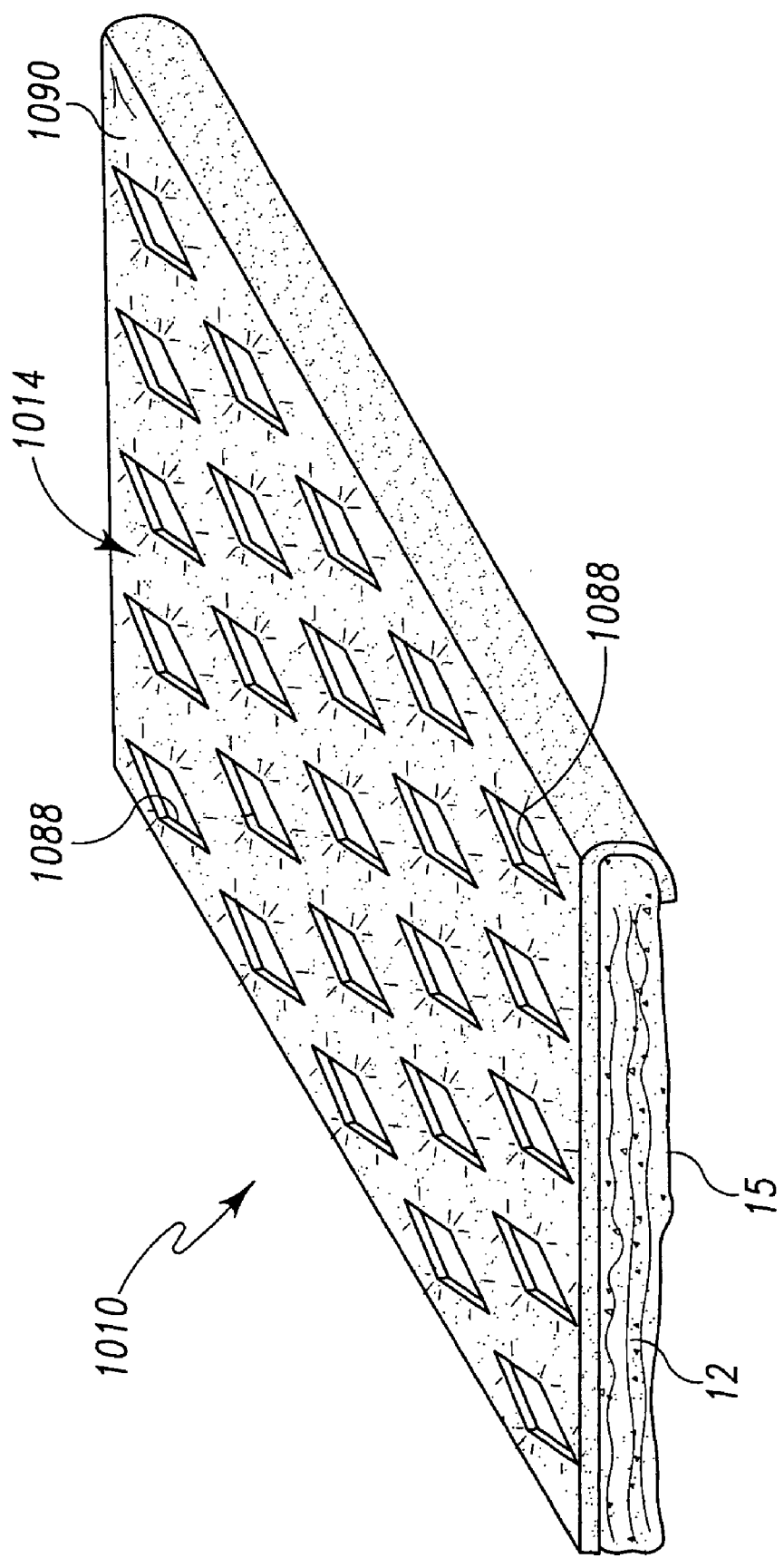
FIG. 21 is a perspective view of another illustrative pipe blanket showing the outer cover of the pipe blanket having slits formed in alternating rows to provide a more flexible pipe blanket.

Yet another means for making the pipe blanket more flexible and more easily wrapped about a pipe is illustrated in FIG. 21, for example. As shown, illustrative cover 1014 of illustrative pipe blanket 1010 has slits 1088 cut in an outside surface 1090 to allow cover 1014 with insulation mat 12 to expand or stretch when laid out flat. As illustrated in FIG. 21, slits 1088 are formed in alternating rows and pipe blanket 1010 is shown in a stretched position such that the slits form a diamond-shaped pattern. In an unstretched position, the illustrative slits 1088 are substantially vertical slits formed in the outer cover 1014. It is within the scope of this disclosure, however, to provided cover 1014 having slits 1088 formed in other suitable patterns. Upon installation of pipe blanket 1010, outside surface 1090 of cover 14 will expand as the pipe blanket 1010 assumes a cylindrical shape about a pipe, thereby causing a circumference of the facing surface 15 of insulation 12 to be less than a circumference of cover 1014. Slits 1088, therefore, act to reduce possible wrinkling of cover 1014 and insulation mat 12 as pipe blanket 1010 is wrapped about a pipe. It is also within the scope of this disclosure for covering 1014 to be a wicking cloth to be wrapped around and in direct contact with a pipe, for example. Therefore, surface 1090 becomes an inside surface which shrinks to have a circumference less than surface 15 of the insulation mat as pipe blanket 1010 is wrapped about a pipe. Further, as shown in FIG. 21, covering (or wicking cloth) 1014 may be wrapped around an outside edge of insulation 12.

Still another means of provided a flexible or conformable pipe blanket which is more easily wrapped around a pipe is to manufacture a pipe blanket having an insulation mat with a graduated density. For example, the inner facing surface 15 of the insulation mat, that is, the surface of the insulation mat formed to lie adjacent the pipe when wrapped around the pipe, may be formed to have a lower density. The lower density of the inner or facing portion of the insulation mat allows the inner portion to be more easily compressed as the pipe blanket is wrapped about a pipe. In other words, the inner portion is compressed more than the outer portion of the insulation mat when the insulation mat is wrapped about a pipe. Therefore, providing for an inner region which is more easily compressed provides for an insulation mat with increased conformability or ability an increased to conform to and/or wrap around a pipe. The lower density fibers are easier to compress in a circumferential direction about a pipe, whereas the higher density fibers provide firmness. Illustratively, the lower or inner density may be approximately 0.3–1.0 lb/ft$^3$. Further illustratively, the higher or outer density may be approximately 0.7–2.5 lb/ft$^3$.

Another means for creating a more conformable insulation mat is to provide a top or inner portion of the insulation mat with fibers positioned to lie in a less laminar or more random fashion than the substantially horizontal fibers of the bottom or outer portion or region of the insulation mat. The fibers of the inner portion of the insulation mat may be oriented in a more random fashion such that a greater percentage of the fibers of the inner region are oriented substantially vertically than the fibers of the outer region. As mentioned above, the fibers of the bottom or outer portion or region of the insulation mat may be positioned to lie generally horizontally. Pleating, for example, changes the fiber orientation of the insulation mat, or a portion of the insulation mat, to create an insulation mat where the fibers are less laminar and more randomly oriented thus including a larger number of substantially vertically oriented fibers. These substantially vertically oriented fibers increase the conformability of the insulation mat. The outer, substantially horizontal fibers of the outer region provide for an outer firmness of the insulation mat.

Figure 28:
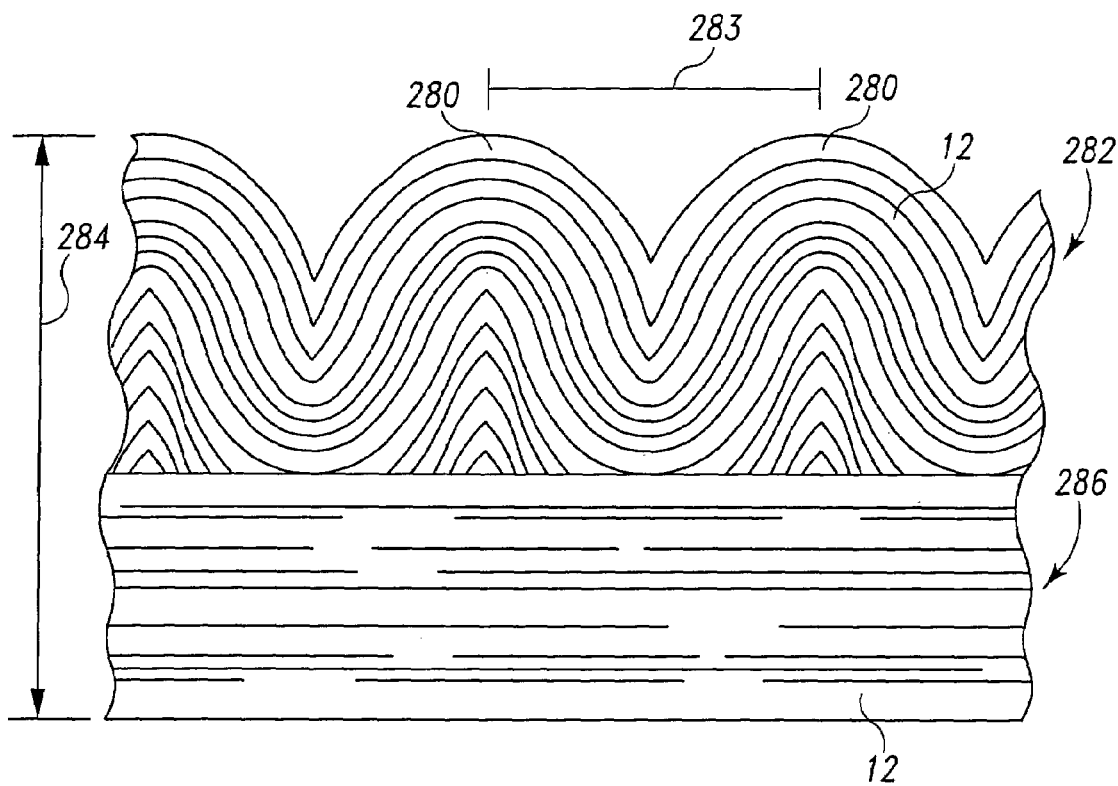
FIG. 28 is a sectional view of a portion of another insulation mat showing an upper or inner portion or region of the mat being pleated while a lower or outer portion or region of the mat is not pleated.

As shown in FIG. 28, for example, partial pleats 280 are formed only in a top portion or region 282 of insulation mat 12. In other words, the partial pleats 280 extend only partially through a thickness 284 of the insulation mat 12. The pleating of the top portion 282 changes the fiber orientation to increase the ability of the insulation mat to conform to and wrap around a pipe. As shown in FIG. 28, the more laminar or substantially horizontal fibers of the an outer portion or region 286 of the insulation mat 12 are not pleated and are positioned to lie generally horizontally along a length of the insulation mat 12. Creating partial pleats 280 may also act to lower the density of the inner portion of the insulation mat. Illustratively, a width 283 of each partial pleat 280 may be approximately ½ to 5 inches. Further illustratively, a width of the pleats 180 disclosed above may also be approximately ½ to 5 inches. As illustratively shown, width 283 may be defined as the distance between two peaks or two valleys of adjoining pleats 280, for example. A total thickness of the insulation mat may be approximately 2 to 4 inches. An inner region or portion of the insulation mat being pleated, having a different density, and/or fiber orientation may be approximately 25–75% of the total thickness of the insulation mat, for example.

The first or inner portion 282 of the insulation mat 12 having pleats 280 may be able to more easily wrap around and conform to a pipe, whereas the second or outer portion 286 of the insulation mat having a laminar fiber orientation may provide for increased outer firmness or compressive resistance of the pipe blanket when the pipe blanket is wrapped around a particular pipe. These two different portions 282, 286 having two different fiber orientations optionally may be formed separately, placed adjacent each other, and heated to create an insulation mat having two different layers each having two different densities and/or properties. Further, the partial pleats 282 of first portion 282 may be formed by pleating only the inner portion of an insulation mat 12 using the same or similar pleating processes described above. As mentioned above, it is within the scope of this disclosure to include an insulation mat having more than two regions having different densities and/or fiber orientations. An insulation mat having a multiplicity and/or gradation of different densities, for example, may be provided.

Rather than creating a more conformable inner portion of the insulation mat by forming partial pleats 282 in insulation mat 12, the conformable portion 282 of the insulation mat 12 may also be formed by using finer or smaller diameter insulation fibers or may be formed by curing the inner portion with a lower weight and/or lesser amount of binder. Smaller and/or finer fibers are more easily bent and wrapped about a pipe to conform to the pipe than larger diameter fibers which may have increased stiffness to resist such wrapping. Therefore, forming a more conformable inner portion of the insulation mat may be accomplished by changing the fiber orientation of the inner portion, such as by pleating, for example, by using smaller/finer fibers for the inner portion, and by providing a graduated density of the insulation mat where the inner portion has a lower density than the outer portion or region. Such a graduated density optionally may be provided by performing a rotary fiber glass process with multiple sources of glass fibers of different size. The graduated density may also be achieved by applying differing amounts of binder as the glass mat is being made. The higher density area or outer portion may also be formed by using heavier or larger fibers having a greater fiber diameter and a higher weight and/or greater amount of binder. Air flow may also effect the density of portions of the insulation mat. For example, flow compaction may be accomplished by using increased air flow to pack the fibers of a portion of the insulation mat closer together to create a more dense portion or region of the insulation mat. It is also within the scope of this disclosure to provide an insulation mat having two or more portions or regions having different fibers, fiber orientations, and/or densities to provide a wrappable or conformable insulation mat for wrapping about a pipe.

Figure 29:
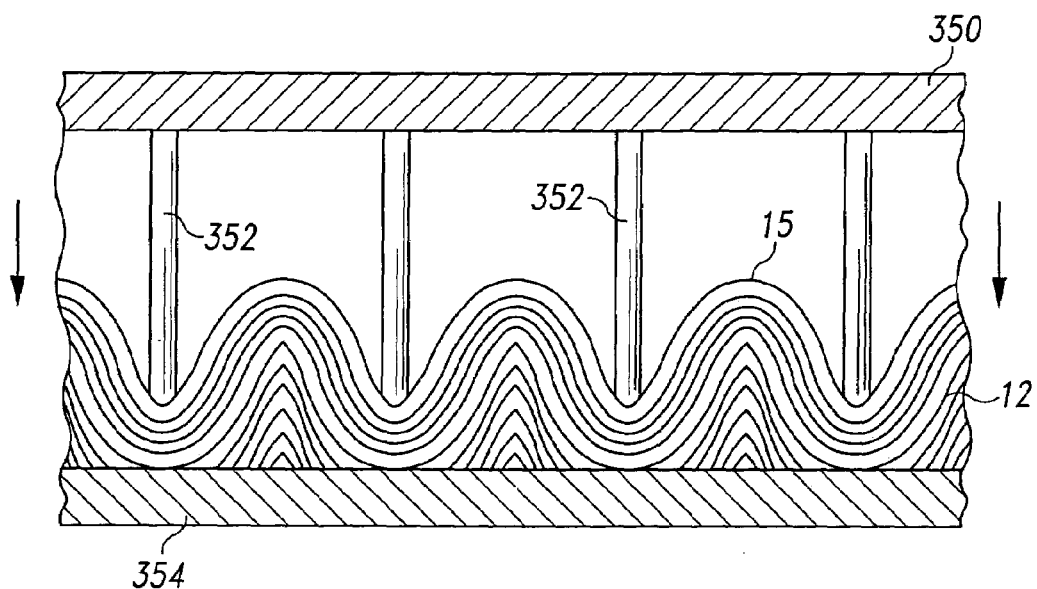
FIG. 29 is a sectional view of an insulation mat between two flights or platens showing an upper platen having rods or spikes to be pressed into the insulation mat to create dimples or grooves within the insulation mat.

Yet another means for providing the pipe blanket with a preferential direction of flexing is to create open grooves or dimples through one surface of the insulation mat of the pipe blanket. As shown in FIG. 29, for example, a top flight or platen 350 is formed with downwardly extending ribs or spikes 352. The illustrative bottom flight or platen 354 does not have any ribs attached thereto. A length of an already molded insulation mat 12 is provide therebetween. As the top flight 350 is lowered onto the insulation mat 12, the ribs 352 depress and/or puncture portions of the insulation mat 12 to create grooves, flutes, or dimples 356 within an upper or inside portion of the insulation mat. These grooves will aid in the ability of the insulation mat 12 to wrap around a pipe such that the inner surface 15 (including the dimples 356) lies adjacent the pipe. The flutes or grooves 356 formed in the insulation mat 12 may provide for an insulation mat 12 having an upper or inner portion having a lower density than a lower portion of the insulation mat 12 which has not been punctured by ribs 352 to form dimples therein. The more dense inner portion provides for a firmer exterior when the insulation mat 12 is incorporated into a pipe blanket and wrapped about a pipe.

As mentioned above, each of the pipe blankets disclosed herein may be used with a wicking cloth. A wicking cloth may be used with both low and high binder insulation, although, it may be more necessary to use a wicking cloth with low binder insulation, which also provides better flexibility and ease of compression. The wicking cloth may be provided with vent holes therein to provide an exit means for moisture which may accumulate about the pipe. An illustrative vent hole diameter may be 0.37 inches and the holes may be formed in rows about 2.0 inches apart as measured from the center diameter of each hole. In another illustrative embodiment, additional rows of holes are used as the thickness of the insulation increases. For example, three rows of holes may be used for an insulation thickness less than about 4.56 inches. Four rows of holes may be used for an insulation thickness between 4.56 inches and 9.63 inches inclusive. Five rows of holes may be used for an insulation thickness greater than 9.63 inches. It is within the scope of this disclosure, however, to include a wicking cloth having any suitable number of holes spaced any suitable distance apart.

Looking now to FIG. 22, pipe blanket 1110, for example, is provided including a wicking cloth 1190 coupled to facing or inside surface 15 of insulation 12. As shown in FIG. 22, wicking cloth 1190 extends around a first edge 1192 of pipe blanket 1110 and is secured to an outside surface 1194 of cover 1114. Further, wicking cloth 1190 is coupled to a portion of flap 1124 of cover 1114 adjacent to and adhesive 1196 with release paper 1198. The portion of wicking cloth 1190 adjacent flap 1124 includes the vent holes 1130 for added wicking of moisture. Wicking cloth 1190 may be coupled to insulation 12 and cover 1114 by an adhesive, for example.

Looking now to FIG. 23, jacket or cover 14 has been formed so that upon unrolling the pipe blanket after shipping, for example, cover 14 (and therefore entire the pipe blanket as well) resumes the pre-cured shape suitable for wrapping about a pipe. FIG. 23 specifically illustrates the jacket cover as it unrolls or unwinds from its rolled-up, packaged state or position to a ready-to-install position. Illustratively, only the jacket cover is shown in FIG. 23, however, an entire pipe blanket (with the insulation coupled to the jacket cover) may unwind in the same or similar manner. A pipe blanket which has a propensity to automatically curl about a pipe may be easier to manage as the blanket is installed and secured about the pipe. One means of curing the covering 14 to give it a memory is to secure the cover 14 about a tube slightly less than the desired diameter of the pipe to which it is to be secured. Next, the covering and tube about which it is wrapped are to be place in an oven, cured, and then cooled. Experimentally, the covering and tube were placed in an oven at about 140–160° F. for about 3 to 5 hours, and then cooled. Once cooled, the covering is then rolled for shipping. As shown in FIG. 23, however, once covering 14 is unrolled, it retains its memory and curls up to form its pre-cured shape so as to grip a pipe. Such a pre-cured covering is able to grip a pipe and thus hold itself about the pipe without the aid of the user or installer thus making the pipe blanket easier to work with and handle.

Another pipe wrapping aid includes a pipe blanket (not shown) having an interior adhesive strip at a first end in addition to a closure flap or device at a second end. Once the pipe blanket is squared with a pipe, the interior adhesive strip is attached to the pipe. The pipe blanket is then wrapped around the pipe one or more revolutions and the closure flap, such as any of the flaps disclosed above, is prepared and sealed at the desired diameter. By coupling the pipe blanket to the pipe before wrapping, the user or installer may more easily handle and manipulate the pipe blanket. In other words, an extra hand is not needed to hold the inside portion of the pipe blanket secure to the pipe while wrapping the pipe blanket about the pipe. If there is a need to slide the pipe blanket along the pipe after the interior adhesive strip has been secured to the pipe, the pipe blanket may be rotated in the reverse direction to release the adhesive strip from the pipe so the position of pipe blanket along the pipe may be readjusted.

Looking now to FIG. 24, a method of anchoring and wrapping a pipe blanket about a pipe, such as pipe 16, for example, is provided. As shown in FIG. 24, one or more wires or bands 17 are wrapped around pipe 16 and secured thereto. Next, the end(s) of the wire(s) or strap(s) are attached to an edge of the covering or jacket of a particular pipe blanket to be installed. For example, one wire end may be poked through a first end of the insulation. The exposed wire(s) are provided to provisionally secure the pipe blanket to the pipe prior to wrapping the blanket around the pipe. The entire pipe blanket is then wrapped to the desired thickness about pipe 16. A portion of the insulation may then be stripped back from the end of the covering to create a closure flap which may then be sealed or taped down to secure the pipe blanket about pipe 16. If desired, a second jacket or covering may be applied over the existing covering. Additionally, a pipe blanket wrapped only one revolution about the pipe may be secured to the pipe by poking or otherwise attaching the second exposed wire end into the trailing end of the pipe blanket. Subsequently, additional closure means may be used to seal the joint created by the two abutting ends of the pipe blanket.

Figure 25:
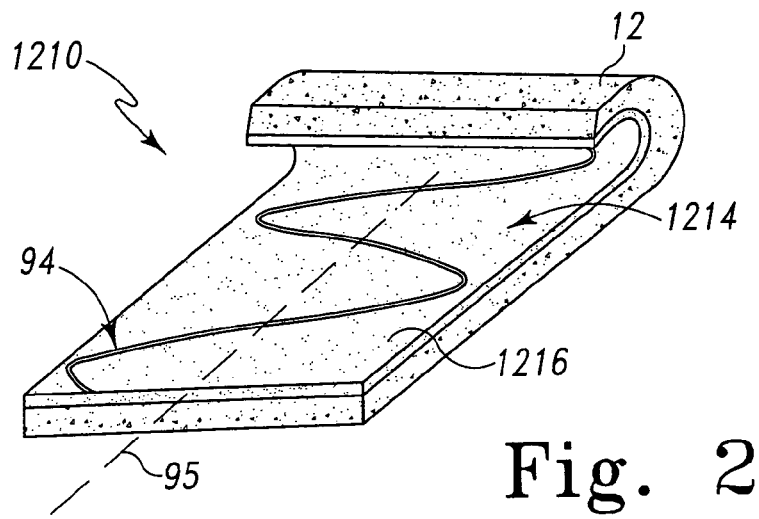
FIG. 25 is a perspective view of yet another illustrative pipe blanket showing a spring coupled to the cover of the pipe blanket in a zig-zag pattern.
Figure 26:
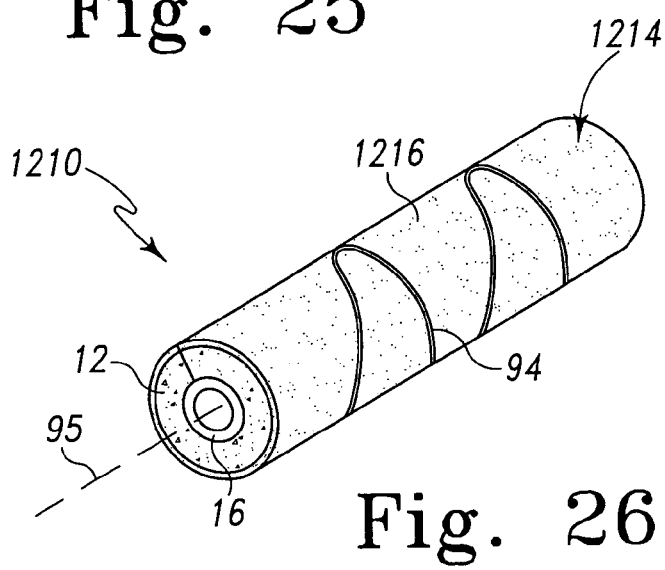
FIG. 26 is a perspective view of the pipe blanket of FIG. 25 showing the blanket wrapped about a pipe and held in curved shape to grip the pipe because of the spring coupled to the cover.

As discussed above with respect to FIG. 11, a spring or elastic strap 650 may be wrapped around the pipe blanket after the pipe blanket is positioned around the pipe to bring and hold the pipe blanket in place around a pipe. Alternatively, however, such a spring or elastic band may be incorporated into the cover of the pipe blanket, as shown in FIGS. 25 and 26, for example. Illustrative pipe blanket 1210 includes a formed spring wire 94 coupled to covering 1214. Spring wire 94 may be in the shape of vertical bands or spring wire 94 helical is shape. Further spring wire 94 may be metal, plastic, or cloth so long as it is elastic and spring-like in function. Illustratively, covering 1214 may be made from a metal, plastic, or reinforced plastic, for example. Spring wire 94 may be coupled to the outer surface 1216 of covering 1214, laminated into covering 1214, or sandwiched between covering 1214 and insulation 12. FIG. 25 shows the pipe blanket 1210 as it is unrolled after having been shipped and prior to installation, for example. Wire 94 is preformed into a cylindrical shape which zig-zags along a central axis 95. Once pipe blanket 10 is unrolled and ready to be installed, spring wire 94 urges pipe blanket 10 to curve about pipe 16 along axis 95, as shown, for example, in FIG. 26.

Figure 27:
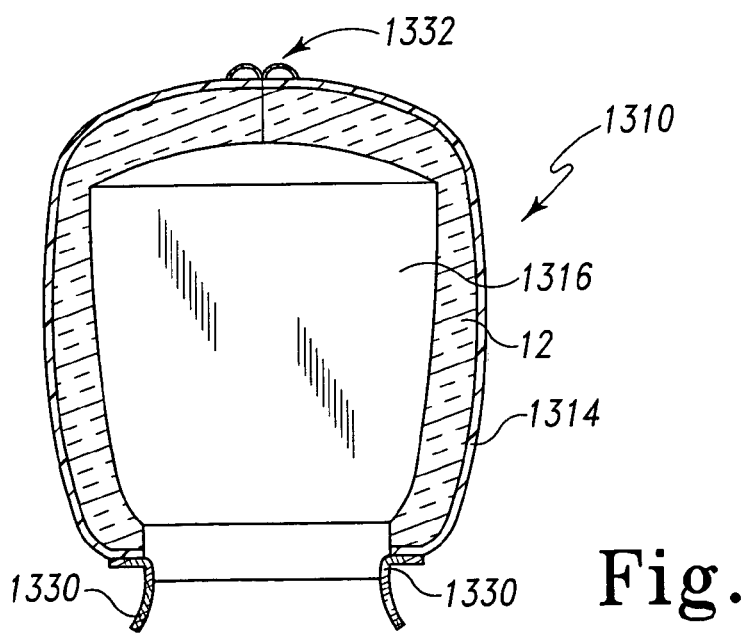
FIG. 27 is a sectional view of another pipe blanket wrapped around a cooling tank.

Although various pipe blankets have been disclosed herein, it is within the scope of this disclosure for the pipe blankets to insulate objects other than pipes. For example, as shown in FIG. 27, a "pipe" blanket 1310 is used to insulate a cooling tank 1316. Pipe blanket 1310 includes insulation 12, a covering 1314, and wicking cloth 1330 such as that disclosed above. Loops 1332 are provided on top and bottom edges of pipe blanket 1310 for drawstrings (not shown) to be threaded therethrough. Alternatively, the drawstrings may also be folded into flanges along the top and bottom edges of the pipe blanket 1310. A top and bottom seam of the pipe blanket 1310 may be held shut by way of any of the closure devices or methods described above such as adhesives, snaps, etc. Similar to the pipe blankets described above, pipe blanket 1310, for use with cooling tank 1316, helps to prevent moisture condensate and mold growth on the cool exterior surface of the cooling tank especially during the summer season. The pipe blanket 1310 will also reduce the risk of freezing in the winter and will reduce noise transmission as well. Types of cooling tanks which may benefit from the use of pipe blanket 1310 include water pressure tanks, commode tanks, portable food and beverage containers (both for cooling and warming), water heaters, water softeners, etc. Further, pipe blanket 1310 may include an exterior design or print to "dress-up" the appearance of the tanks and pipes which are exposed to public view, for example.

The fibrous insulation of all pipe blankets disclosed herein may further be infused with a flexible polymer to provide a more abuse-resistant insulation. The flexible polymer infused therein may reduce fiber breakage to help contain loose fiber or binder particles. The flexible binder may be applied on the fiber pack insulation after a thermoset resin is cured on the fibers to give rigidity and recovery. Such polymer infused insulation may be used anyplace where flexure, folding, or repeated movement may occur such as with flexible hoses, curtains, hinges, portable containers, etc.

The pleated, partially pleated, multiple density, varied fiber orientation, as well as varied fiber sizes used to create multiple regions of the insulation mats described above are illustratively configured for circularizing or conformingly fitting about a pipe. Such insulation mats have features that allow for a smaller inside radius to be formed while still supplying sufficient support on the outer surface of the insulation mat. Thus the pleated, partially pleated, multiple density, varied fiber orientation, as well as varied fiber sizes used to create multiple regions of the insulation mats each provide a means for circularizing a pipe blanket about a pipe. Further, these conforming means also aid in maintaining a desired thickness of the pipe blanket after wrapping the pipe blanket about a pipe. Maintaining thickness after wrapping may provide for increased thermal performance.

The invention claimed is:

1. A pipe blanket for wrapping around and insulating a pipe comprising:
    an insulation mat having an outer surface and an inner surface adapted to enclose the pipe when the pipe blanket is wrapped around the pipe,
    an outer cover coupled to the outer surface of the insulation mat, and
    closure means configured for securing the insulation mat and outer cover about the pipe, wherein the insulation mat is configured to enclose a variety of pipes having different sized diameters, wherein the closure means comprises a flap coupled to a portion of the outer cover and an adhesive coupled to an underside of the flap to couple the flap to another portion of the outer cover when the pipe blanket is wrapped around a pipe, and wherein the adhesive of the closure means includes a non-removable weak adhesive portion coupled directly to the underside of the flap and a strong adhesive portion adjacent the weak adhesive portion and coupled directly to the underside of the flap.

2. The pipe blanket of claim 1, wherein the weak adhesive portion is a temporary adhesive provided for initial positioning of the pipe blanket about the pipe and the strong adhesive portion is a substantially permanent adhesive.

3. The pipe blanket of claim 1, wherein the closure means further includes a removable release strip covering the strong adhesive.

4. The pipe blanket of claim 1, wherein the outer cover is tear-resistant and includes a reinforced laminate layer.

5. The pipe blanket of claim 1, wherein the outer cover is configured to be rolled along a first axis to define a storage configuration and is further configured to retain a preformed shape about a second axis in an unrolled configuration.

* * * * *